(12) United States Patent
Kempa et al.

(10) Patent No.: US 7,589,880 B2
(45) Date of Patent: *Sep. 15, 2009

(54) APPARATUS AND METHODS FOR MANIPULATING LIGHT USING NANOSCALE COMETAL STRUCTURES

(75) Inventors: Krzysztof J. Kempa, Billerica, MA (US); Michael J. Naughton, Norwood, MA (US); Zhifeng Ren, Newton, MA (US); Jakub A. Rybczynski, Cambridge, MA (US)

(73) Assignee: The Trustees of Boston College, Chestnut Hill, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/509,209

(22) Filed: Aug. 24, 2006

(65) Prior Publication Data
US 2007/0107103 A1 May 10, 2007

Related U.S. Application Data

(63) Continuation-in-part of application No. 11/401,606, filed on Apr. 10, 2006.

(60) Provisional application No. 60/711,004, filed on Aug. 24, 2005, provisional application No. 60/710,948, filed on Aug. 24, 2005, provisional application No. 60/711,003, filed on Aug. 24, 2005, provisional application No. 60/799,293, filed on May 9, 2006.

(51) Int. Cl.
*G02F 1/03* (2006.01)

(52) U.S. Cl. ............... 359/245; 359/248; 977/834; 252/501.1; 136/243

(58) Field of Classification Search ............ 359/245, 359/247, 248, 237, 321, 322, 296; 257/17, 257/20, 301, 314, 414, 532, 758, 759, 767, 257/773, 774; 438/20, 381, 385, 620, 622, 438/629, 99, 128, 506, 643, 658, 690, 692, 438/800; 977/742, 765, 834, 845, 939, 943; 361/762, 775, 795; 428/372, 379; 136/243, 136/251, 257, 259; 442/340, 341, 414; 365/151; 252/501.1, 507, 511; 385/123
See application file for complete search history.

(56) References Cited

U.S. PATENT DOCUMENTS 3,312,870 A * 4/1967 Rhoades .................. 361/775

(Continued)

FOREIGN PATENT DOCUMENTS

EP 1507298 2/2005

(Continued)

OTHER PUBLICATIONS

Atwater et al., *The New "p-n Junction": Plasmonics Enables Photonic Access to the Nanoworld*, MRS Bulletin, 30 (5), pp. 385-389, ISSN 0883-7694, May 2005.

(Continued)

*Primary Examiner*—Loha Ben
(74) *Attorney, Agent, or Firm*—Greenberg Traurig, LLP; David J. Dykeman; Danielle T. Abramson

(57) ABSTRACT

An apparatus and methods for manipulating light using nanoscale cometal structures are disclosed. A nanoscale optics apparatus for manipulating light includes a plurality of nanoscale cometal structures each comprising a dielectric material located between a first electrical conductor and a second electrical conductor. A method of fabricating a nanoscale optics apparatus for manipulating light includes preparing a plurality of nanoscale planar structures; coating a plurality of planar surfaces of the plurality of planar structures with a dielectric while leaving space between the plurality of planar surfaces; and coating the dielectric with an outer electrical conductor layer, wherein a portion of the outer electrical conductor layer is located between the planar structures to form coplanar structures.

25 Claims, 13 Drawing Sheets

U.S. PATENT DOCUMENTS

| | | | | |
|---|---|---|---|---|
| 3,401,369 A * | 9/1968 | Roche et al. | | 439/62 |
| 3,432,664 A * | 3/1969 | Robison | | 378/103 |
| 3,711,848 A | 1/1973 | Martens | | 340/280 |
| 3,821,664 A * | 6/1974 | Godard et al. | | 372/84 |
| 3,990,914 A | 11/1976 | Weinstein et al. | | 136/89 |
| 4,105,470 A | 8/1978 | Skotheim | | 136/89 SJ |
| 4,197,142 A | 4/1980 | Bolton et al. | | 136/89 SJ |
| 4,360,703 A | 11/1982 | Bolton et al. | | 136/263 |
| 4,445,050 A | 4/1984 | Marks | | 307/145 |
| 4,445,080 A | 4/1984 | Curtiss | | 318/798 |
| 4,774,554 A | 9/1988 | Dentai et al. | | 357/17 |
| 4,783,605 A | 11/1988 | Tomisawa et al. | | 307/450 |
| 4,803,688 A | 2/1989 | Lawandy | | 372/21 |
| 4,854,876 A | 8/1989 | Heath et al. | | 434/29 |
| 4,886,555 A | 12/1989 | Hackstein et al. | | 136/255 |
| 4,913,744 A | 4/1990 | Hoegl et al. | | 136/244 |
| 5,009,958 A | 4/1991 | Yamashita et al. | | 428/411.1 |
| 5,028,109 A | 7/1991 | Lawandy | | 350/96.12 |
| 5,078,803 A | 1/1992 | Pier et al. | | 136/256 |
| 5,084,365 A | 1/1992 | Gratzel et al. | | 429/111 |
| 5,105,305 A | 4/1992 | Betzig et al. | | 359/368 |
| 5,157,674 A | 10/1992 | Lawandy | | 372/22 |
| 5,171,373 A | 12/1992 | Hebard et al. | | 136/252 |
| 5,185,208 A | 2/1993 | Yamashita et al. | | 428/411.1 |
| 5,211,762 A | 5/1993 | Isoda et al. | | 136/263 |
| 5,233,621 A | 8/1993 | Lawandy | | 372/22 |
| 5,250,378 A | 10/1993 | Wang | | 430/83 |
| 5,253,258 A | 10/1993 | Lawandy | | 372/22 |
| 5,264,048 A | 11/1993 | Yoshikawa et al. | | 136/263 |
| 5,267,336 A | 11/1993 | Sriram et al. | | 385/2 |
| 5,272,330 A | 12/1993 | Betzig et al. | | 250/216 |
| 5,291,012 A | 3/1994 | Shimizu et al. | | 250/216 |
| 5,331,183 A | 7/1994 | Sariciftci et al. | | 257/40 |
| 5,332,910 A | 7/1994 | Haraguchi et al. | | 257/13 |
| 5,333,000 A | 7/1994 | Hietala et al. | | 342/368 |
| 5,360,764 A | 11/1994 | Celotta et al. | | 437/173 |
| 5,380,410 A | 1/1995 | Sawaki et al. | | 204/130 |
| 5,383,038 A | 1/1995 | Lawandy | | 359/7 |
| 5,434,878 A | 7/1995 | Lawandy | | 372/43 |
| 5,437,736 A | 8/1995 | Cole | | 136/259 |
| 5,448,582 A | 9/1995 | Lawandy | | 372/42 |
| 5,479,432 A | 12/1995 | Lawandy | | 372/102 |
| 5,481,630 A | 1/1996 | Lawandy | | 385/16 |
| 5,489,774 A | 2/1996 | Akamine et al. | | 250/234 |
| 5,493,628 A | 2/1996 | Lawandy | | 385/122 |
| 5,508,881 A * | 4/1996 | Stevens | | 361/305 |
| 5,524,011 A | 6/1996 | Lawandy | | 372/22 |
| 5,547,705 A | 8/1996 | Fukuzawa et al. | | 427/162 |
| 5,548,113 A | 8/1996 | Goldberg et al. | | 250/234 |
| 5,585,962 A | 12/1996 | Dixon | | 359/328 |
| 5,589,235 A | 12/1996 | Ogawa | | 428/1 |
| 5,604,635 A | 2/1997 | Lawandy | | 359/620 |
| 5,625,456 A | 4/1997 | Lawandy | | 356/376 |
| 5,689,603 A | 11/1997 | Huth | | 385/131 |
| 5,694,498 A | 12/1997 | Manasson et al. | | 385/15 |
| 5,742,471 A * | 4/1998 | Barbee et al. | | 361/312 |
| 5,747,861 A | 5/1998 | Dentai | | 257/435 |
| 5,789,742 A | 8/1998 | Wolff | | 250/227.11 |
| 5,796,506 A | 8/1998 | Tsai | | 359/191 |
| 5,862,286 A | 1/1999 | Imanishi et al. | | 385/122 |
| 5,872,422 A | 2/1999 | Xu et al. | | 313/311 |
| 5,888,371 A | 3/1999 | Quate | | 205/122 |
| 5,894,122 A | 4/1999 | Tomita | | 250/234 |
| 5,897,945 A | 4/1999 | Lieber et al. | | 428/323 |
| 5,902,416 A | 5/1999 | Kern et al. | | 136/244 |
| 5,973,444 A | 10/1999 | Xu et al. | | 313/309 |
| 5,994,691 A | 11/1999 | Konada | | 250/234 |
| 6,038,060 A | 3/2000 | Crowley | | 359/328 |
| 6,043,496 A | 3/2000 | Tennant | | 250/492.1 |
| 6,052,238 A | 4/2000 | Ebbesen et al. | | 359/738 |
| 6,083,843 A | 7/2000 | Ohja et al. | | 438/710 |
| 6,096,496 A | 8/2000 | Frankel | | 435/4 |
| 6,100,525 A | 8/2000 | Eden | | 250/338.1 |
| 6,146,196 A * | 11/2000 | Burger et al. | | 439/578 |
| 6,146,227 A | 11/2000 | Mancevski | | 445/24 |
| 6,183,714 B1 | 2/2001 | Smalley et al. | | 423/447.3 |
| 6,194,711 B1 | 2/2001 | Tomita | | 250/234 |
| 6,201,242 B1 | 3/2001 | Eden et al. | | 250/332 |
| 6,211,532 B1 | 4/2001 | Yagi | | 257/40 |
| 6,212,292 B1 | 4/2001 | Soares | | 382/141 |
| 6,233,045 B1 | 5/2001 | Suni et al. | | 356/28.5 |
| 6,258,401 B1 | 7/2001 | Crowley | | 427/126.3 |
| 6,271,130 B1 | 8/2001 | Rajh et al. | | 438/677 |
| 6,278,231 B1 * | 8/2001 | Iwasaki et al. | | 313/310 |
| 6,310,583 B1 | 10/2001 | Saunders | | 343/786 |
| 6,322,938 B1 | 11/2001 | Cohn | | 430/8 |
| 6,333,458 B1 | 12/2001 | Forrest et al. | | 136/259 |
| 6,365,466 B1 | 4/2002 | Krivokapic | | 438/283 |
| 6,410,935 B1 | 6/2002 | Rajh et al. | | 257/43 |
| 6,415,082 B1 | 7/2002 | Wach | | 385/39 |
| 6,445,006 B1 | 9/2002 | Brandes et al. | | 257/76 |
| 6,456,423 B1 | 9/2002 | Nayfeh et al. | | 359/328 |
| 6,472,594 B1 | 10/2002 | Ichinose et al. | | 136/256 |
| 6,514,771 B1 | 2/2003 | Seul | | 436/518 |
| 6,515,274 B1 | 2/2003 | Moskovits et al. | | 250/216 |
| 6,569,575 B1 | 5/2003 | Biebuyck et al. | | 430/5 |
| 6,621,079 B1 | 9/2003 | Shao et al. | | 250/306 |
| 6,642,129 B2 | 11/2003 | Liu et al. | | 438/496 |
| 6,657,305 B1 * | 12/2003 | Cohen et al. | | 257/773 |
| 6,700,550 B2 | 3/2004 | Crowley | | 343/792.5 |
| 6,724,064 B2 | 4/2004 | Watanabe et al. | | 257/459 |
| 6,740,807 B2 | 5/2004 | Ono | | 136/263 |
| 6,749,827 B2 | 6/2004 | Smalley et al. | | 423/447.3 |
| 6,756,025 B2 | 6/2004 | Colbert et al. | | 423/447.3 |
| 6,782,154 B2 | 8/2004 | Zhao et al. | | 385/16 |
| 6,824,755 B2 | 11/2004 | Colbert et al. | | 423/447.1 |
| 6,833,162 B2 | 12/2004 | Chattopadhyay et al. | | 427/273 |
| 6,835,534 B2 | 12/2004 | Weiss et al. | | 430/311 |
| 6,838,297 B2 * | 1/2005 | Iwasaki et al. | | 438/20 |
| 6,849,948 B2 * | 2/2005 | Chen et al. | | 257/758 |
| 6,867,443 B2 | 3/2005 | Liu et al. | | 257/226 |
| 6,882,051 B2 | 4/2005 | Majumdar et al. | | 257/746 |
| 6,891,623 B1 | 5/2005 | Baudon et al. | | 356/491 |
| 6,897,158 B2 | 5/2005 | Sharma | | 438/713 |
| 6,913,713 B2 | 7/2005 | Chittibabu et al. | | 252/501.1 |
| 6,936,233 B2 | 8/2005 | Smalley et al. | | 423/447.1 |
| 6,946,336 B2 * | 9/2005 | Pang et al. | | 438/199 |
| 6,949,237 B2 | 9/2005 | Smalley et al. | | 423/447.3 |
| 6,969,897 B2 | 11/2005 | Kim, II | | 257/432 |
| 6,979,709 B2 | 12/2005 | Smalley et al. | | 524/495 |
| 6,985,223 B2 | 1/2006 | Drachev et al. | | 356/301 |
| 6,996,147 B2 | 2/2006 | Majumdar et al. | | 372/43 |
| 7,005,378 B2 | 2/2006 | Crocker, Jr. et al. | | 438/674 |
| 7,008,604 B2 | 3/2006 | Smalley et al. | | 423/447.1 |
| 7,013,708 B1 | 3/2006 | Cho et al. | | 73/31.05 |
| 7,019,391 B2 * | 3/2006 | Tran | | 257/678 |
| 7,035,498 B2 | 4/2006 | Wu et al. | | 385/16 |
| 7,041,620 B2 | 5/2006 | Smalley et al. | | 502/182 |
| 7,048,903 B2 | 5/2006 | Colbert et al. | | 423/447.1 |
| 7,048,999 B2 | 5/2006 | Smalley et al. | | 428/367 |
| 7,052,666 B2 | 5/2006 | Colbert et al. | | 423/447.1 |
| 7,053,351 B2 | 5/2006 | Li et al. | | 250/201.3 |
| 7,057,832 B2 | 6/2006 | Wu et al. | | 359/811 |
| 7,060,510 B2 | 6/2006 | Bonnell et al. | | 438/3 |
| 7,067,098 B2 | 6/2006 | Colbert et al. | | 423/447.1 |
| 7,068,898 B2 | 6/2006 | Buretea et al. | | 385/123 |
| 7,071,406 B2 | 7/2006 | Smalley et al. | | 136/252 |
| 7,088,003 B2 * | 8/2006 | Gates et al. | | 257/774 |
| 7,097,820 B2 | 8/2006 | Colbert et al. | | 423/447.2 |
| 7,115,864 B2 | 10/2006 | Colbert et al. | | 250/306 |
| 7,126,183 B2 * | 10/2006 | Forbes et al. | | 257/314 |
| 7,129,567 B2 * | 10/2006 | Kirby et al. | | 257/621 |
| 7,132,711 B2 * | 11/2006 | Forbes et al. | | 257/314 |
| 7,169,329 B2 | 1/2007 | Wong et al. | | 252/502 |

| | | | |
|---|---|---|---|
| 7,195,813 B2 * | 3/2007 | Burberry et al. | 428/212 |
| 7,208,793 B2 * | 4/2007 | Bhattacharyya | 257/314 |
| 7,224,985 B2 * | 5/2007 | Caci | 455/456.1 |
| 7,233,071 B2 * | 6/2007 | Furukawa et al. | 257/759 |
| 7,238,415 B2 * | 7/2007 | Rodriguez et al. | 428/297.4 |
| 7,242,073 B2 * | 7/2007 | Mosley et al. | 257/532 |
| 7,291,782 B2 | 11/2007 | Sager et al. | 136/250 |
| 7,301,199 B2 | 11/2007 | Lieber et al. | 257/327 |
| 7,411,343 B2 * | 8/2008 | Han | 313/503 |
| 2001/0001681 A1 | 5/2001 | Zhang et al. | 427/508 |
| 2001/0037823 A1 | 11/2001 | Middelman | 136/251 |
| 2002/0098135 A1 | 7/2002 | Smalley et al. | 422/198 |
| 2002/0102196 A1 | 8/2002 | Smalley et al. | 422/198 |
| 2002/0102201 A1 | 8/2002 | Colbert et al. | 423/445 R |
| 2002/0122873 A1 | 9/2002 | Mirkin et al. | 427/2.1 |
| 2002/0150524 A1 | 10/2002 | Smalley et al. | 422/198 |
| 2002/0159943 A1 | 10/2002 | Smalley et al. | 423/447.1 |
| 2003/0021967 A1 | 1/2003 | Sagiv et al. | 428/209 |
| 2003/0068432 A1 | 4/2003 | Dai et al. | 427/58 |
| 2003/0089899 A1 | 5/2003 | Lieber et al. | 257/9 |
| 2003/0134267 A1 | 7/2003 | Kang et al. | 435/4 |
| 2003/0213922 A1 | 11/2003 | Gordon et al. | 250/492.1 |
| 2004/0075464 A1 | 4/2004 | Samuelson et al. | 326/37 |
| 2004/0077156 A1 | 4/2004 | Tsakalakos et al. | 438/479 |
| 2004/0131843 A1 | 7/2004 | Mirkin et al. | 428/327 |
| 2004/0169615 A1 | 9/2004 | Crowley | 343/810 |
| 2004/0232321 A1 | 11/2004 | Miles et al. | 250/235 |
| 2004/0245209 A1 | 12/2004 | Jung et al. | 216/8 |
| 2005/0006623 A1 | 1/2005 | Wong et al. | 252/70 |
| 2005/0181409 A1 | 8/2005 | Park et al. | 435/6 |
| 2005/0189480 A1 | 9/2005 | Hollingsworth | 250/234 |
| 2005/0191434 A1 | 9/2005 | Mirin et al. | 427/457 |
| 2005/0194035 A1 | 9/2005 | Jin et al. | 136/252 |
| 2005/0194038 A1 | 9/2005 | Brabec et al. | 136/256 |
| 2005/0199894 A1 | 9/2005 | Rinzler et al. | 257/94 |
| 2005/0211294 A1 | 9/2005 | Chittibabu et al. | 136/263 |
| 2005/0221202 A1 | 10/2005 | Gofron | 430/5 |
| 2005/0221577 A1 | 10/2005 | Li et al. | 438/401 |
| 2005/0230270 A1 | 10/2005 | Ren et al. | 205/777.5 |
| 2005/0243410 A1 | 11/2005 | Bachmann et al. | 359/342 |
| 2005/0255237 A1 | 11/2005 | Zhang et al. | 427/180 |
| 2005/0272856 A1 | 12/2005 | Cooper et al. | 254/496 |
| 2006/0014001 A1 | 1/2006 | Zhang et al. | 428/195.1 |
| 2006/0024438 A1 | 2/2006 | Ku et al. | 427/237 |
| 2006/0027543 A1 | 2/2006 | Cheng | 219/121.69 |
| 2006/0040057 A1 | 2/2006 | Sheehan et al. | 427/256 |
| 2006/0043257 A1 | 3/2006 | Cheng et al. | 250/201.3 |
| 2006/0054922 A1 | 3/2006 | Pettit | 257/116 |
| 2006/0082379 A1 | 4/2006 | Liu et al. | 324/754 |
| 2006/0110618 A1 | 5/2006 | Manivannan et al. | 428/566 |
| 2006/0158760 A1 | 7/2006 | Portico Ambrosio et al. | 359/883 |
| 2007/0047056 A1 | 3/2007 | Kempa et al. | 359/245 |
| 2007/0081242 A1 | 4/2007 | Kempa et al. | 359/486 |
| 2007/0105240 A1 | 5/2007 | Kempa et al. | 438/3 |
| 2007/0107103 A1 | 5/2007 | Kempa et al. | 977/834 |
| 2007/0137697 A1 | 6/2007 | Kempa et al. | 136/256 |
| 2007/0138376 A1 | 6/2007 | Naughton et al. | 250/216 |
| 2007/0181177 A9 | 8/2007 | Sager et al. | 136/263 |
| 2007/0240757 A1 | 10/2007 | Ren et al. | 136/256 |
| 2007/0281156 A1 * | 12/2007 | Lieber et al. | 428/373 |

FOREIGN PATENT DOCUMENTS

| | | |
|---|---|---|
| JP | 57-089212 | 6/1982 |
| WO | WO 03/016901 | 2/2003 |
| WO | WO 2007/086903 | 8/2007 |
| WO | WO 2007/120175 | 10/2007 |

OTHER PUBLICATIONS

Balasubramanian et al., *Biosensors Based on Carbon Nanotubes*, Anal. Bioanal. Chem. vol. 385, pp. 452-468, 2006.

Burns, G., *Solid State Physics*, Academic Press Inc., Orlando, pp. 487-489, 1985.

Delzeit et al., *Growth of Carbon Nanotubes by Thermal and Plasma Chemical Vapour Deposition Processes and Applications in Microscopy*, Nanotechnology, vol. 13, pp. 280-284, 2002.

Evident Technologies, Inc., *Quantum Dots in High Efficiency Photovoltaics Using EviDots*, pp. 1-8, Jan. 2006.

Fumeaux et al., *Measurement of the Resonant Lengths of Infrared Dipole Antennas*, Infrared Physics and Technology, vol. 41, pp. 271-281, 2000.

Griggs et al., *P-n Junction Heterostructure Device Physics Model of a Four Junction Solar Cell*, Proceedings of SPIE, vol. 6339, pp. 63390D1-63390-D8, 2006.

Guo et al., *Metal-Insulator-Semiconductor Electrostatics of Carbon Nanotubes*, Applied Physics Letters, vol. 81, No. 8, pp. 1486-1488, Aug. 19, 2002.

Guo et al., *Performance Projections for Ballistic Carbon Nanotube Field-Effect Transistors*, Applied Physics Letters, vol. 80, No. 17, pp. 3192-3194, Apr. 29, 2002.

Heavens, O.S., *Optical Properties of Thin Solid Films*, Dover Publications, Inc., New York, pp. 113-116, 1955.

Huang et al., *Growth of Large Periodic Arrays of Carbon Nanotubes*, Applied Physics Letters, vol. 82, No. 3, pp. 460-462, Jan. 20, 2003.

Jorio et al., *Polarized Resonant Raman Study of Isolated Single-Wall Carbon Nanotubes: Symmetry Selection Rules, Dipolar and Multipolar Antenna Effects*, Physical Review B, vol. 65, pp. 121402-1-121402-4, 2002.

Kayes et al., *Comparison of the Device Physics Principles of Planar and Radial p-n Junction Nanorod Solar Cells*, Journal of Applied Physics, 97 (11), Art. No. 114302, pp. 114302-1-114302-11, 2005.

Kayes et al., *Radial pn Junction Nanorod Solar Cells: Device Physics Principles and Routes to Fabrication in Silicon*, Photovoltaic Specialists Conference 2005, Conference Record of the Thirty-Fifth Proceedings of the IEEE, pp. 55-58, Jan. 3-7, 2005.

Kempa et al., *Photonic Crystals Based on Periodic Arrays of Aligned Carbon Nanotubes*, Nano Letters, vol. 3, No. 1, pp. 13-18, 2003.

Milanovic et al., *A Simple Process for Lateral Single Crystal Silicon Nanowires*, Proceedings of IMECE'02, 2002 ASME International Engineering Congress & Exposition, New Orleans, LA, IMCE 2002-33392, pp. 1-7, Nov. 17-22, 2002..

Moon et al., *Field Theory for Engineers*, D. Van Nostrand Company Inc., Princeton, NJ, pp. 504-509, 1961.

Ren et al., *Synthesis of Large Arrays of Well-Aligned Carbon Nanotubes on Glass*, Science, vol. 282, pp. 1105-1107, Nov. 6, 1998.

Sotiropoulou et al., Carbon Nanotube Array-Based Biosensor, Anal. Bioanal. Chem., vol. 375, pp. 103-105, 2003.

Staebler et al., *Reversible Conductivity Changes in Discharge-Produced Amorphous Si*, Applied Physics Letters, vol. 31, No. 4, pp. 292-294, 1977.

Teo et al., *Uniform Patterned Growth of Carbon Nanotubes Without Surface Carbon*, Applied Physics Letters, vol. 79, No. 10, pp. 1534-1536, Sep. 3, 2001.

Terman, F.E., *Radio Engineering*, McGraw-Hill Book Company, New York, Chapter 14, pp. 662-731, 1947.

von Roedern, B. et al., *The Role of Polycrystalline Thin-Film PV Technologies for Achieving Mid-Term Market Competitive PV Modules*, Conference Record of 31st IEEE Photovoltaics Specialists Conference and Exhibition, Lake Buena Vista, FL, Jan. 3-7, 2005.

Wang et al., *Receiving and transmitting Light-Like Radio Waves: Antenna Effect in Arrays of Aligned Carbon Nanotubes*, Applied Physics Letters, vol. 85, No. 13, pp. 2607-2609, Sep. 27, 2004.

Yamamoto, et al., *Photoconductive Coaxial Nanotubes of Molecularly Connected Electron Donor and Acceptor Layers*, Science, vol. 314, pp. 1761-1764, Dec. 15, 2006.

PCT International Search Report based on PCT/US06/33119 dated Sep. 14, 2007.

Ambit Corporation Press Release, "AMBIT Corporation Announces Solar Energy Initiative", (4 pages), Apr. 26, 2006 at www.nanotechnow.com/news.cgi?story_id=15038, accessed on Oct. 25, 2007.

Nanotechnology News, "Carbon Nanotube Structures Could Provide More Efficient Solar Power for Soldiers", (3 pages), Oct. 15, 2007 at www.azonano.com/news.asp?newsID=548, accessed on Oct. 25, 2007.

Center for Multifunctional Polymer Nanomaterials and Devices (CMPND), "Polymer Photonics", (6 pages), © 2003 found at www.capce.ohio-state.edu/CMPND/Photonics.htm, accessed on Oct. 25, 2007.

Ago, Hiroki et al. "Composites of Carbon Nanotubes and Conjugated Polymers for Photovoltaic Devices"; Advanced Materials, vol. 11, No. 15, pp. 1281-1285 (1999).

Berland, B. "Photovoltaic Technologies Beyond the Horizon: Optical Rectennas Solar Cell"; National Renewal Energy Laboratory, Final Report, NREL/SR-520-33263 (Feb. 2003).

Crozier, K.B. et al. "Optical antennas: Resonators for local field enhancement", Journal of Applied Physics, vol. 94, No. 7, pp. 4632-4642 (Oct. 1, 2003).

Su, Y.K. et al. "The Red Shift of ZnSSe Metal-Semiconductor-Metal Light Emitting Diodes with High Injection Currents", IEEE Transaction of Electron Devices, vol. 47, No. 7, pp. 1330-1333 (Jul. 2000).

Wang, Y. et al. "Receiving and Transmitting Light-like radio waves: Antenna Effect in Arryas of Aligned Carbon Nanotubes", Applied Physics Letters, vol. 85, No. 13, pp. 2607-2609 (Sep. 27, 2004).

International Search Report for PCT/US06/13331 dated May 21, 2008.

International Search Report for PCT/US06/32452 dated Jun. 5, 2008.

Terman "Radio Engineering" McGraw-Hill Book Co. NY Ch. 14, pp. 662-731, 1947.

* cited by examiner

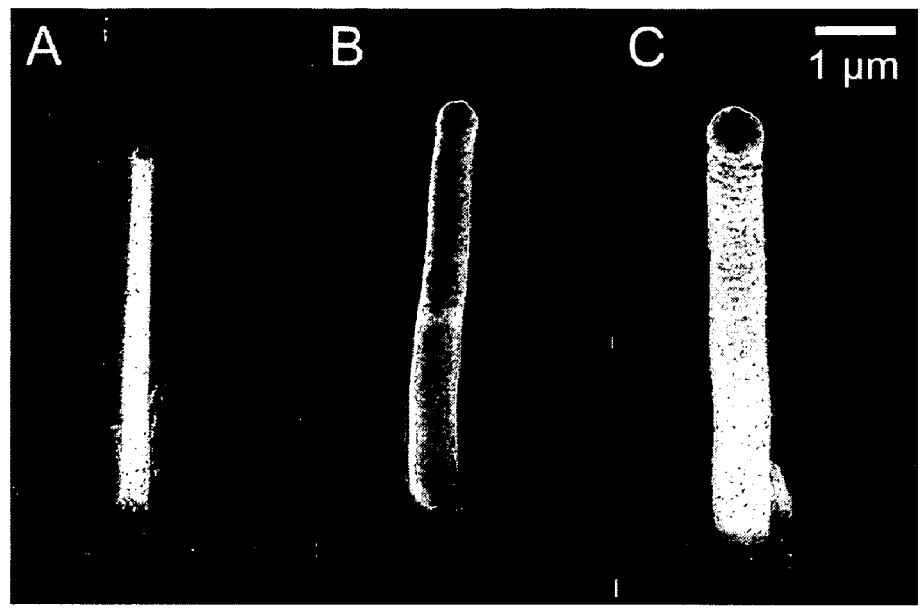
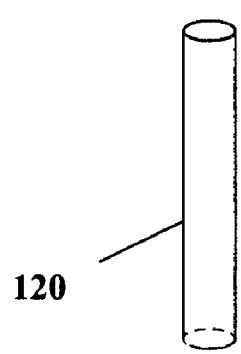 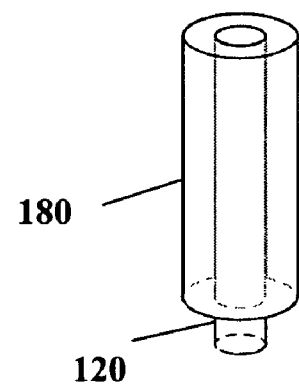 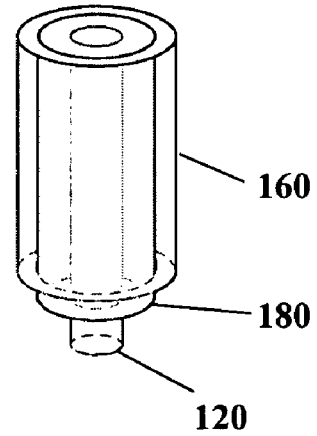
FIG. 2A  FIG. 2B  FIG. 2C

FIG. 3A
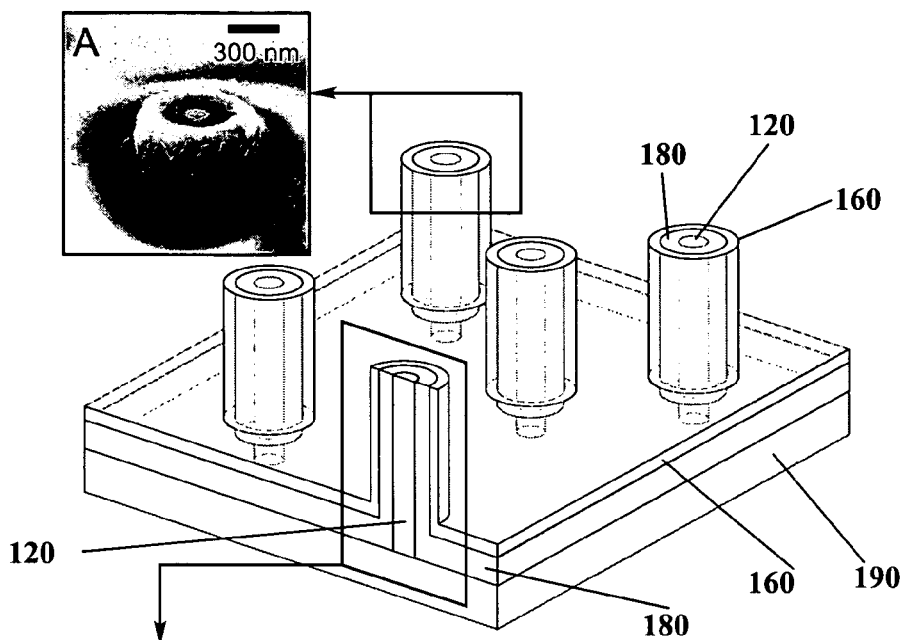
FIG. 3
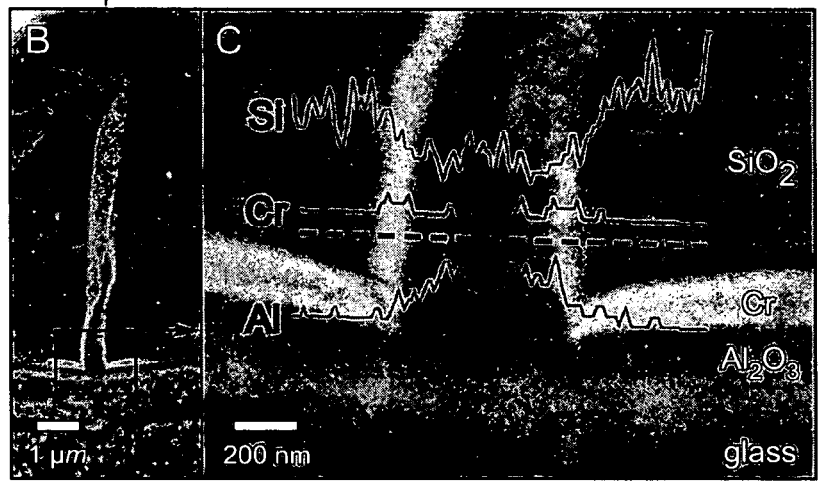
FIG. 3B        FIG. 3C

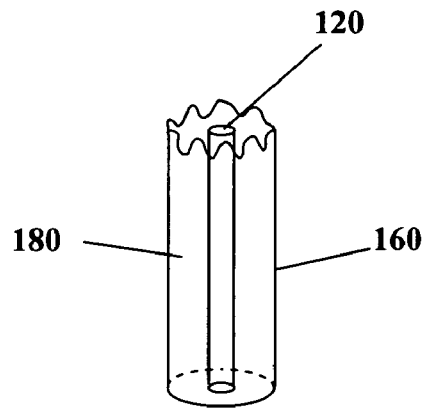
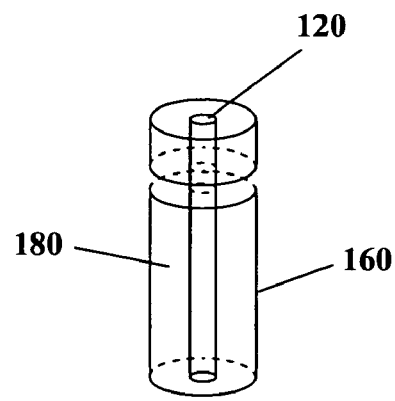
FIG. 19　　　　　FIG. 20
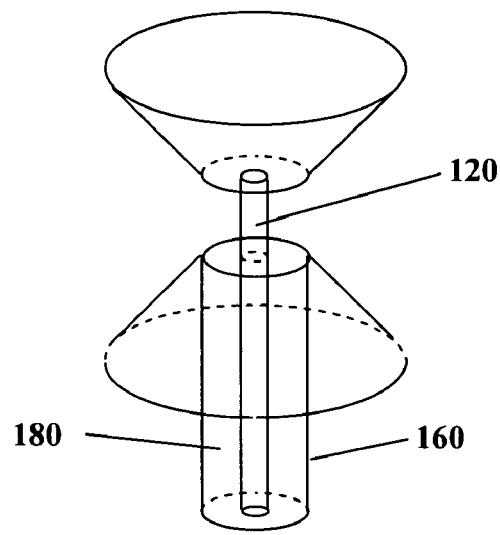
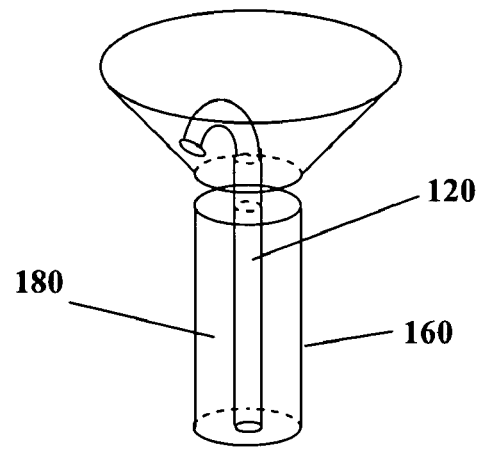
FIG. 21　　　　　FIG. 22

APPARATUS AND METHODS FOR MANIPULATING LIGHT USING NANOSCALE COMETAL STRUCTURES

RELATED APPLICATIONS

This application is a continuation-in-part of U.S. Ser. No. 11/401,606, filed Apr. 10, 2006, which claims the benefit of U.S. Provisional Application Ser. No. 60/711,004, filed Aug. 24, 2005, and this application also claims the benefit U.S. Provisional Application Ser. Nos. 60/710,948, filed Aug. 24, 2005; 60/711,003, filed Aug. 24, 2005; and 60/799,293, filed May 9, 2006, and the entirety of all these applications are hereby incorporated herein by reference for the teachings therein.

GOVERNMENT SUPPORT

The invention was supported, in whole or in part, by Contract No. DAAD16-02-C-0037 from the U.S. Army Natick Soldier Systems Center. The Government has certain rights in the invention.

FIELD

The embodiments disclosed herein relate to the field of optics, and more particularly to an apparatus and method for manipulating light using nanoscale cometal structures.

BACKGROUND

Nanoscale optics is the study of interactions of electromagnetic radiation, in particular the part of the electromagnetic spectrum that contains visible light (between ultraviolet and infrared), with matter structured into units of nanoscale dimensions (under approximately one micrometer). Nanoscale optics has numerous applications in optical technologies such as nanolithography, high-density optical data storage, photochemistry on the nano scale, solar cells, materials imaging and surface modification with subwavelength lateral resolution, local linear and nonlinear spectroscopy of biological and solid-state structures, quantum computing, quantum communication and optical networking.

Prior art systems do not permit control of visible light in nanometer-sized structures. For example, plasmonics, an emerging branch of photonics that uses nanostructured materials to attempt to control light on the nanometer scale using plasma surface waves, offers more restricted scale light manipulation.

Prior art attempts to manufacture solar cells using optical rectifying antennae (rectennae) have had difficulties in achieving large-scale metallic nanostructures at low cost. Recently, multi-walled carbon nanotubes (MWCNTs) were reported to behave like optical antennae that receive and transmit visible light incident upon them. These nanostructures with well aligned growth orientation were shown to be highly metallic. MWCNTs can also be fabricated at low cost in large scale on most conductive or semiconductive substrates by the well-established plasma-enhanced chemical vapor deposition (PECVD) method without using expensive and time-consuming state-of-the-art technologies, such as electron-beam lithography, which are unscalable but still inevitably being used by most other experimental approaches in this field. Thus, there is a need in the art to create a new class of very efficient, and low cost nanoscale cometal structures for numerous applications.

SUMMARY

An apparatus and methods for manipulating light using nanoscale cometal structures are disclosed herein. The cometal structures may be coaxial or coplanar.

According to aspects illustrated herein, there is provided a nanoscale optics apparatus for manipulating light comprising a plurality of nanoscale cometal structures each comprising a dielectric material located between a first electrical conductor and a second electrical conductor.

According to aspects illustrated herein, there is provided a coaxial nanoscale optics apparatus for manipulating light comprising a plurality of nanoscale coaxial structures each comprising an electrically conducting core contacting a dielectric material and coated with an outer electrical conductor layer.

According to aspects illustrated herein, there is provided a coplanar nanoscale optics apparatus for manipulating light comprising a plurality of nanoscale coplanar structures each comprising a dielectric layer located between a first electrically conducting layer and a second electrically conducting layer; wherein light enters the coplanar structure between the first electrically conducting layer and the second electrically conducting layer.

According to aspects illustrated herein, there is provided a method of fabricating a nanoscale optics apparatus for manipulating light comprising preparing a plurality of nanoscale planar structures; coating a plurality of planar surfaces of the plurality of planar structures with a dielectric semiconductor while leaving space between the plurality of planar surfaces; and coating the dielectric semiconductor with an outer electrical conductor layer, wherein a portion of the outer electrical conductor layer is located between the planar structures to form coplanar structures.

BRIEF DESCRIPTION OF THE DRAWINGS

The presently disclosed embodiments will be further explained with reference to the attached drawings, wherein like structures are referred to by like numerals throughout the several views. The drawings are not necessarily to scale, the emphasis having instead been generally placed upon illustrating the principles of the presently disclosed embodiments.

FIG. 2A, FIG. 2B, and FIG. 2C each show a schematic view and an exemplary view of a nanoscale coaxial transmission line built around an aligned carbon nanotube. FIG. 2A shows a schematic view and an exemplary view of an aligned carbon nanotube. FIG. 2B shows a schematic view and an exemplary view of an aligned carbon nanotube after coating with a dielectric material. FIG. 2C shows a schematic view and an exemplary view of an aligned carbon nanotube after coating with a dielectric material and an outer conductor material.

FIG. 3 shows an array of nanoscale coaxial transmission lines built around aligned carbon nanotubes. FIG. 3A shows an exposed coaxial cometal structure viewed by a scanning electron microscope (SEM). FIG. 3B shows a cross-section view of a single nanoscale coaxial cometal transmission line viewed by a scanning electron microscope. FIG. 3C shows an energy dispersive x-ray spectroscopy (EDS) analysis of the composition of the coaxial layers showing concentration mapping for silicon (Si), chromium (Cr), and aluminum (Al).

FIG. 19 shows a perspective view of a rough-edge nanoscale coaxial cometal structure.

FIG. 20 shows a perspective view of a ring-cut nanoscale coaxial cometal structure.

FIG. 21 shows a perspective view of a double-cone nanoscale coaxial cometal structure.

FIG. 22 shows a perspective view of a loop nanoscale coaxial cometal structure terminating inside a horn.

Figure 1A:
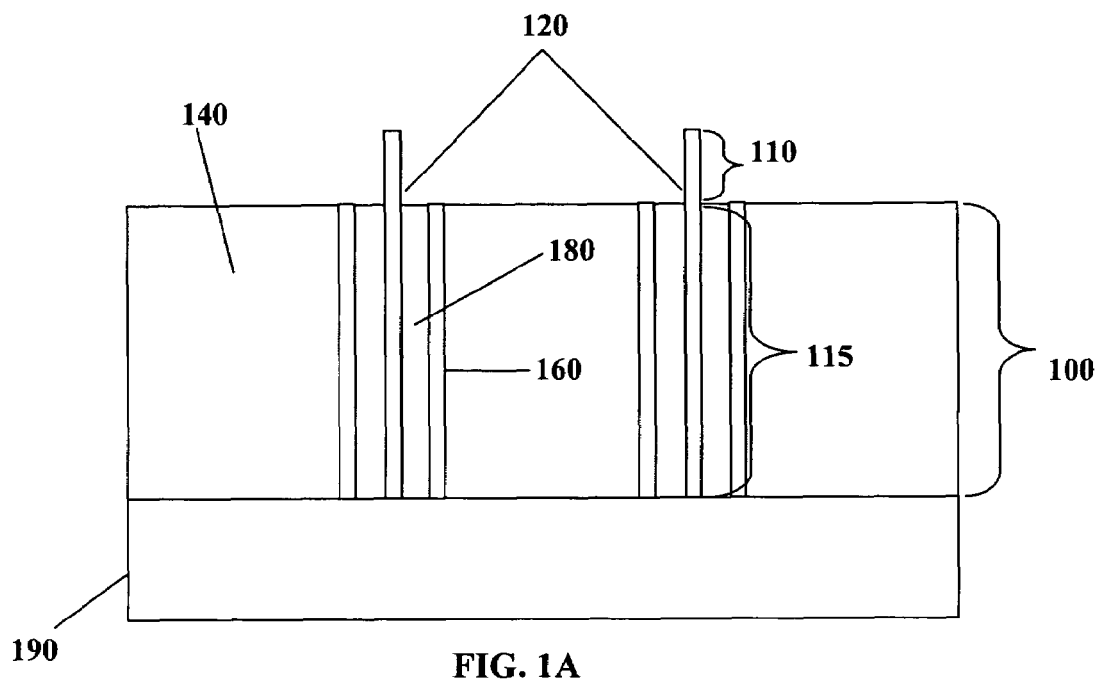
FIG. 1A shows a schematic view of a plurality of nanoscale coaxial cometal structures of the disclosed embodiments embedded in a conductive matrix.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The embodiments disclosed herein relate to the field of optics, and more particularly to an apparatus and methods for manipulating light using nanoscale cometal structures. Methods of fabricating nanoscale cometal structures are also disclosed. Nanoscale optics devices that can control, redirect, switch on and off, or otherwise manipulate light, especially visible light, are useful in electronic, optical, and electro-optical applications.

The basic elements of discrete nanoscale optics are disclosed. Nanoscale cometal structures are used to manipulate electromagnetic radiation on the nanoscale. Nanoscale cometal structures can be coaxial or coplanar. Nanoscale cometal structures can be used with various radiation collecting schemes. Nanoscale cometal configurations can split and couple radiation. New concepts of nanomedia based on nanoscale cometal structures are also disclosed. The nanomedia mediate the radiation from one side of the medium to the other. Employing voltage-dependent media as the nanoscale cometal structure filling controls the mediated radiation and allows radiation switching, scanning, and patterning.

Nanoscale coaxial wires, or nanocoax, are used to manipulate electromagnetic radiation on the nanoscale.

The following definitions are used to describe the various aspects and characteristics of the presently disclosed embodiments.

As referred to herein, "carbon nanotube", "nanotube", "nanowire", "nanofiber" and "nanorod" are used interchangeably. In particular, the material comprising the nanostructure need not be carbon.

As referred to herein, "nanoscale" refers to distances and features below about 5000 nanometers (one nanometer equals one billionth of a meter).

As referred to herein, "single-walled carbon nanotubes" (SWCNTs) include one graphene sheet rolled into a cylinder. "Double-walled carbon nanotubes" (DWCNTs) include two graphene sheets in parallel, and those with multiple sheets (typically about 3 to about 30) are "multi-walled carbon nanotubes" (MWCNTs). For the coaxial nanostructures disclosed herein, MWCNTs need not be specifically graphitic (i.e. crystalline graphene) in structure, but can be fibrous.

As referred to herein, "single-core coaxial transmission lines" (SCCTL) include one nanotube at the center. "Double-core coaxial transmission lines" (DCCTL) include two nanotubes toward the center.

As referred to herein, CNTs are "aligned" wherein the longitudinal axis of individual tubules are oriented in a direction substantially parallel to one another.

As referred to herein, a "tubule" is an individual CNT.

The term "linear CNTs" as used herein, refers to CNTs that do not contain branches originating from the surface of individual CNT tubules along their linear axes.

The term "conductor" as used herein refers to an electrically conducting material. A conductor may be a metallic or non-metallic material.

The term "array" as used herein, refers to a plurality of CNT tubules or other such nanowires that are attached to a substrate material proximally to one another.

As referred to herein, a "nanoscale coaxial line" refers to a nanoscale coaxial wire, which includes a plurality of concentric layers. In an embodiment, the nanoscale coaxial line has three concentric layers: an internal conductor, a photovoltaic coating around the core, and an outer conductor. Transmission of electromagnetic energy inside the coaxial line is wavelength-independent and happens in transverse electromagnetic (TEM) mode. In an embodiment, the internal conductor is a metallic core. In an embodiment, the outer conductor is a metallic shielding.

As referred to herein, a "nanoscale coplanar line" refers to a nanoscale coplanar structure, which includes a plurality of parallel layers. In an embodiment, the nanoscale coplanar line has three parallel layers: two metallic conductors, with a photovoltaic coating between them. Transmission of electromagnetic energy inside the coplanar line is wavelength-independent and happens in transverse electromagnetic (TEM) mode.

As referred to herein, "transverse electromagnetic (TEM)" refers to an electromagnetic mode in a transmission line for which both the electric and magnetic fields are perpendicular to the direction of propagation. Other possible modes include but are not limited to transverse electric (TE), in which only the electric field is perpendicular to the direction of propagation, and transverse magnetic (TM), in which only the magnetic field is perpendicular to the direction of propagation.

As referred to herein, a "catalytic transition metal" can be any transition metal, transition metal alloy or mixture thereof. Examples of a catalytic transition metals include, but are not limited to, nickel (Ni), silver (Ag), gold (Au), platinum (Pt), palladium (Pd), iron (Fe), ruthenium (Ru), osmium (Os), cobalt (Co), rhodium (Rh) and iridium (Ir). In an embodiment, the catalytic transition metal comprises nickel (Ni). In an embodiment, the catalytic transition metal comprises iron (Fe). In an embodiment, the catalytic transition metal comprises cobalt (Co).

As referred to herein, a "catalytic transition metal alloy" can be any transition metal alloy. Preferably, a catalytic transition metal alloy is a homogeneous mixture or solid solution of two or more transition metals. Examples of a catalytic transition metal alloy include, but are not limited to, a nickel/gold (Ni/Au) alloy, nickel/chromium (Ni/Cr) alloy, iron/chromium (Fe/Cr) alloy, and a cobalt/iron (Co/Fe) alloy.

The terms "nanotubes," "nanowires," "nanorods," "nanocrystals," "nanoparticles" and "nanostructures" are employed interchangeably herein. These terms primarily refer to material structures having sizes, e.g., characterized by their largest dimension, in a range of a few nanometers (nm) to about a few microns. In applications where highly symmetric structures are generated, the sizes (largest dimensions) can be as large as tens of microns.

The term "CVD" refers to chemical vapor deposition. In CVD, gaseous mixtures of chemicals are dissociated at high temperature (for example, $CO_2$ into C and $O_2$). This is the "CV" part of CVD. Some of the liberated molecules may then be deposited on a nearby substrate (the "D" in CVD), with the rest pumped away. Examples of CVD methods include but are not limited to, "plasma enhanced chemical vapor deposition" (PECVD), "hot filament chemical vapor deposition" (HFCVD), and "synchrotron radiation chemical vapor deposition" (SRCVD).

As referred to herein, an "optical signal" refers to any electromagnetic radiation pulse including gamma rays, X-rays, ultraviolet light, visible light, infrared, microwaves, radio waves (ULF, VLF, LF, MF, HF, long, short, HAM, VHF, UHF, SHF, EHF), cosmic microwave background radiation and other forms of radiation of the electromagnetic spectrum.

The presently disclosed embodiments generally relate to the use of nanoscale cometal lines to fabricate a nanoscale optics apparatus. The nanoscale optics apparatus is a multi-functional nanocomposite material made of a metallic film having a top surface and a bottom surface and a plurality of cometal structures. The nanoscale coaxial line comprises a metallic cylinder, filled with a dielectric material and having a central, concentric metallic core. Each nanoscale coaxial line can have the central core extending beyond a surface of the film and an embedded portion that is within the film. The nanoscale coplanar line comprises metallic walls, with the intervening space filled with a photovoltaic material. Each nanoscale coplanar line can have a wall extending beyond a surface of the film and an embedded portion that is within the film.

A cometal structure is a structure wherein two or more, but typically two, metal surfaces are in close proximity, in such a way that transverse electromagnetic (TEM) waves are efficiently propagated in the space in between the two metals. The metals or their surfaces can be composed of the same or different metal materials. Some of these metals could be transparent to the guided radiation. The cometal transmission line might also admit other modes of propagation, for example transverse electric (TE) or transverse magnetic (TM) modes. A conventional example of a cometal structure is a coaxial wire or cable. A nanoscale cometal structure is a structure wherein the separation distance between any two metals in the cometal structure is nanoscale, whereby nanoscale is in the range from about 1 nm to about a few thousand nanometers. The two primary examples of a nanoscale cometal structure are a nanoscale coaxial wire and a nanoscale coplanar transmission line. Both of these cometal structures, and variants thereof, are capable of transmitting waves via the TEM mode, including waves whose wavelengths are smaller than the metal separation distances (i.e., subwavelength propagation). Finite length cometal structures enable standing waves, and act as radiation resonators. By virtue of the nanoscale dimensions, such waves include those in and near the visible spectrum, that is, from the ultraviolet (between about 200 nm and about 400 nm) to the infrared (between about 800 nm and about 5000 nm).

The presently disclosed embodiments increase harvesting efficiencies for photons and charge carriers by using a conductive medium, an elementary unit including a nanoantenna impedance matched to a nanoscale coaxial line filled with a dielectric-active medium. While the nanoantenna provides efficient light collection, the nanoscale cometal section traps the collected radiation, and assures its efficient conversion into electron-hole pairs when the dielectric is photovoltaic. For the nanoscale coaxial embodiment, the coaxial symmetry yields improved harvesting efficiency for both photons and charge carriers because it is efficient at conveying the TEM mode of electromagnetic radiation. The nanoscale coaxial line length can be made several microns long to assure high photon harvesting, and the nanoscale coaxial line width can be easily made small enough in diameter to provide high carrier harvesting between internal and external electrodes. The coaxial line allows for subwavelength propagation, and thus a very small distance between electrodes. In fact, the distance between electrodes may be less than the carrier diffusion length without hampering the light propagation (i.e., nanoscale). The nanoscale coplanar embodiment is also efficient at conveying the TEM mode of electromagnetic radiation, and so yields high harvesting efficiency for both photons and charge carriers.

The presently disclosed embodiments work with any transmission line capable of transverse electromagnetic (TEM) transmission. Such lines include, but are not limited to, coaxial transmission line (i.e., a coaxial line with a single core), the multi-core coaxial transmission lines (multi-core coax), striplines, and coplanar lines. A stripline is a transmission line including two flat parallel metallic electrodes (strips), separated by a film of a dielectric. The width L of each electrode is larger than the radiation wavelength. The electrodes are distance d apart, which can be smaller than the radiation wavelength. In an embodiment, a nanoscale coaxial line with a plurality of cores (multi-core) can be used to yield high harvesting efficiency for both photons and charge carrier. In an embodiment, a nanostripline (i.e., a stripline for visible light, which has d in the nanoscale) yields high harvesting efficiency for both photons and charge carriers.

Antennae are external resonators. The nanoantennas of the presently disclosed embodiments are broad resonators having large aspect ratios, that is their length l is much larger than their diameter d: for example, l>3d. The bandwidth of the nanoantenna can be tuned to cover the entire solar spectrum. The nanoantennas described herein possess the directional characteristics of conventional antennas, proving that conventional, radio technology applies to nanoscale optics systems in the visible frequency range.

The performance of the system of the presently disclosed embodiments will be comparable to that of c-Si, without its disadvantages, such as high material and installation costs. The system of the presently disclosed embodiments allows for even further improvements. With a multi-layer strategy, the photon energy can be matched to the semiconductor band gap, reducing phonon losses, and further improving efficiency.

FIG. 1A shows a schematic view of a nanoscale optics apparatus 100 including a plurality of nanoscale coaxial structures. The nanoscale coaxial structure includes an internal conductor 120 with an impedance-matched antenna 110 and a coaxial section 115 coated with a dielectric material 180. The nanoscale optics apparatus 100 is supported by a substrate 190. The internal conductor 120 extends beyond the nanoscale coaxial structure forming the optical nano-antenna 110. An outer conductor 160 is an external coating of the coaxial section 115. A plurality of nanoscale coaxial structures are embedded in a conductive matrix 140. The nanoscale optics apparatus is made in accordance with the presently disclosed embodiments.

The internal conductor 120 may be a metallic core. Examples of metals for the internal conductor include but are not limited to, carbon fiber; carbon nanotube; pure transition metals such as nickel (Ni), aluminum (Al), or chromium (Cr); metal alloys, e.g. stainless steel (Fe/C/Cr/Ni) or aluminum alloys (Al/Mn/Zn); and metallic polymers. Other internal conductors are highly doped semiconductors, and semi-metals (metals with vanishingly small band gap, e.g. graphite). Those skilled in the art will recognize that the internal conductor may be other conducting materials known in the art and be within the spirit and scope of the presently disclosed embodiments.

The dielectric material 180 may be uniform around the internal conductor 120 or the dielectric material 180 may surround the internal conductor 120 in a non-uniform manner. In an embodiment, the dielectric material may be air or a vacuum. In embodiments that move or manipulate light, the dielectric material should not be photovoltaic. In embodiments that convert light to electricity, thus preventing movement of the light, the dielectric material may be a photovoltaic dielectric. The photovoltaic material has a band gap to maximize the absorption of light in the visible spectrum. Examples of photovoltaic materials include, but are not limited to silicon (Si), cadmium telluride (CdTe), indium gallium phosphide (InGaP), gallium arsenide (GaAs), germanium (Ge), Cu(InGa)Se, GaP, CdS, indium antimonide (InSb), lead telluride (PbTe), In1-x GaxN, organic semiconductors (e.g., copper phthalocyanine (CuPc)), dielectric materials, and similar materials known to those skilled in the art. The photovoltaic materials can be crystalline (periodic arrangement of atoms in macroscopic scale), polycrystalline (periodic arrangement of atoms in microscopic scale), or amorphous (aperiodic arrangement of atoms in macroscopic scale). Those skilled in the art will recognize that the photovoltaic material may be other materials having band gap to maximize the absorption of light in the visible spectrum known in the art and be within the spirit and scope of the presently disclosed embodiments.

The outer conductor 160 may be a metal. Thus, the outer conductor 160 may take the form of a metallic cylinder. Examples of outer conductors include but are not limited to, carbon fiber; carbon nanotube; pure transition metals such as nickel (Ni), aluminum (Al), or chromium (Cr); metal alloys e.g. stainless steel (Fe/C/Cr/Ni) or aluminum alloys (Al/Mn/Zn); and metallic polymers. Other internal conductors are highly doped semiconductors, and semi-metals (metals with vanishingly small band gap, e.g. graphite). Those skilled in the art will recognize that the outer conductor may be other conducting materials known in the art and be within the spirit and scope of the presently disclosed embodiments.

Figure 1B:
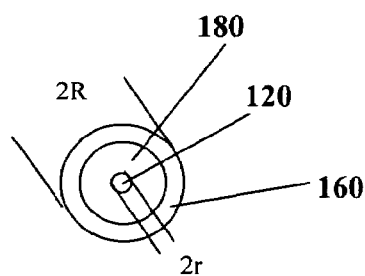
FIG. 1B shows a top view of a nanoscale coaxial structure of FIG. 1A.

FIG. 1B shows a top view of the nanoscale optics apparatus of FIG. 1A. In FIG. 1B, the diameter of the internal conductor 120 is 2r while the diameter of the outer conductor 160 is 2R. Those skilled in the art will recognize that the diameters can vary and be within the spirit and scope of the presently disclosed embodiments.

FIG. 2A, FIG. 2B, and FIG. 2C each show a schematic view and an exemplary view of a nanoscale coaxial transmission line built around aligned carbon nanotube. FIG. 2A, FIG. 2B, and FIG. 2C show a single nanoscale coaxial structure selected from an array having a plurality of nanoscale coaxial structures. The schematic views show the major steps for fabricating nanoscale optics apparatus. The exemplary views were taken using a scanning electron microscope (SEM) at a 30 degree angle to the sample surface.

FIG. 2A shows a schematic view and an exemplary view of an aligned carbon nanotube. The plasma-enhanced chemical vapor deposition (PECVD) method was used to grow vertically aligned, multiwalled, straight carbon nanotubes with an average length of about 5-6 µm using a nickel catalyst (FIG. 2A). The catalyst was electrodeposited on a thin chromium layer (about 10 nm) sputtered on the top of a glass substrate.

FIG. 2B show a schematic view and an exemplary view of an aligned carbon nanotube after coating with a dielectric material. The nanotubes were coated with a dielectric layer of aluminum oxide ($Al_2O_3$). The dielectric layer has a thickness between about 100 nm to about 150 nm or thicker.

FIG. 2C shows a schematic view and an exemplary view of an aligned carbon nanotube after being coated with a dielectric material and an outer conductive material. The nanotubes were sputtered with about 100 nm to about 150 nm thick chromium layer as the outer conductor. In an embodiment, the outer conductor is thicker than 150 nm.

FIG. 3 shows an array of nanoscale coaxial transmission lines built around aligned carbon nanotubes. The array may have nanoscale coaxial transmission lines distributed uniformly or randomly on a substrate 190. The nanoscale coaxial transmission lines may be aligned in rows or unevenly distributed on the substrate 190. The substrate 190 may be transparent. The substrate 190 may be composed of a polymer, glass, ceramic material, carbon fiber, glass fiber or combinations thereof. Those skilled in the art will recognize that the substrate may be other materials known in the art and be within the spirit and scope of the presently disclosed embodiments.

An array of vertically aligned conductors (e.g., multi-walled carbon nanotubes or other nanowires/nanofibers) are grown or attached to the substrate. Next, the conductors are coated with appropriate dielectric or photovoltaic material. The conductors are then coated with the metallic layer acting as the outer conductor.

An array of nanoscale coaxial transmission lines includes vertically aligned carbon nanotubes grown on glass substrate coated with a thin (about 10 nm) chromium layer. On this layer nickel catalyst for PECVD growth of nanotubes was deposited electrochemically. Then, nanotubes were coated with 150 nm of aluminum oxide and subsequently with 100 nm of chromium. The entire array of nanoscale coaxes was filled with spin-on-glass (SOG) which does not affect array functionality but allowed the top part of the nanoscale coaxes to be mechanically polished off. This way nanoscale coaxial cores could be exposed and they could work as wavelength-independent transmission lines. FIG. 3A shows an exposed coaxial structure viewed by a scanning electron microscope (SEM).

FIG. 3B shows a cross-section view of a single nanoscale coaxial transmission line viewed by a scanning electron microscope. FIG. 3B shows the internal structure of the nanoscale coaxial transmission line after polishing and being exposed.

FIG. 3C shows an energy dispersive x-ray spectroscopy (EDS) analysis of the composition of the coaxial layers showing concentration mapping for silicon (Si), chromium (Cr), and aluminum (Al). The dotted line in FIG. 3C corresponds to the position of the EDS linescan while three presented plots correspond to silicon (Si), chromium (Cr), and aluminum (Al) concentration along the scanned line. FIG. 3C shows that the concentration of silicon is highest in the silica ($SiO_2$) rich area. Similarly, highest chromium concentration is present in the region of metallic coating of nanoscale coaxial walls, and highest aluminum concentration is observed in the area of dielectric coating ($Al_2O_3$).

Cometal structures include two or more, but typically two, metal surfaces in close proximity so transverse electromagnetic (TEM) waves are efficiently propagated in the space in between. TEM modes can have arbitrary frequency, even such that the corresponding wavelength is much larger than spacing between metals. This is called a subwavelength propagation.

The spacing between the metals can be filled with a dielectric material, or with a layered structure. Such a layered structure might include a layer made of a transparent (to the mode) metal (e.g., a transparent conducting oxide, TCO). A transparent metal that conducts at low frequencies (radio or dc) can be used to bias the dielectric (nonmetallic) films. The figures below show various specific geometries of the cometallic structures, but those skilled in the art will recognize that numerous other cometal structures are within the spirit and scope of the presently disclosed embodiments.

Figure 4:
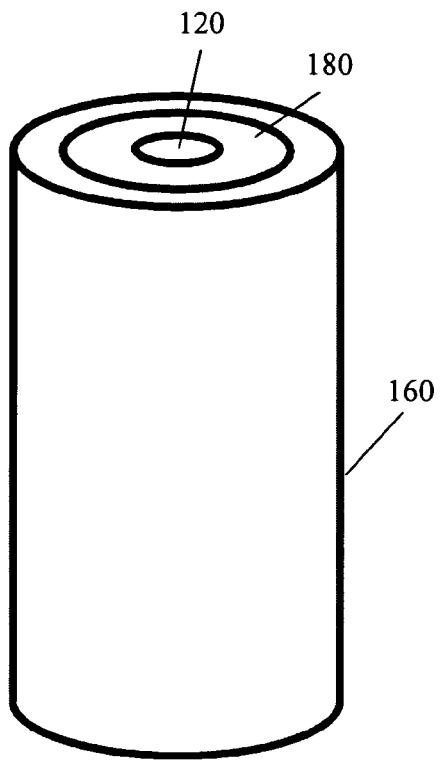
FIG. 4 shows a perspective view of a concentric coaxial cometal waveguide.

FIG. 4 shows a concentric coaxial waveguide (two-electrode coax). The concentric coaxial waveguide includes two concentric cylindrical metallic electrodes (an inner conductor and an outer conductor). A dielectric material is located in the space between the inner conductor and the outer conductor. In an embodiment, the inner core can be made of a transparent metal, meaning that the waveguide is no longer a coax, and thus no TEM mode can propagate. In this embodiment, propagation of TE (transverse electric) and/or TM (transverse magnetic) modes (multi-mode operation) occurs with sufficiently large inter-electrode spacing.

Figure 5:
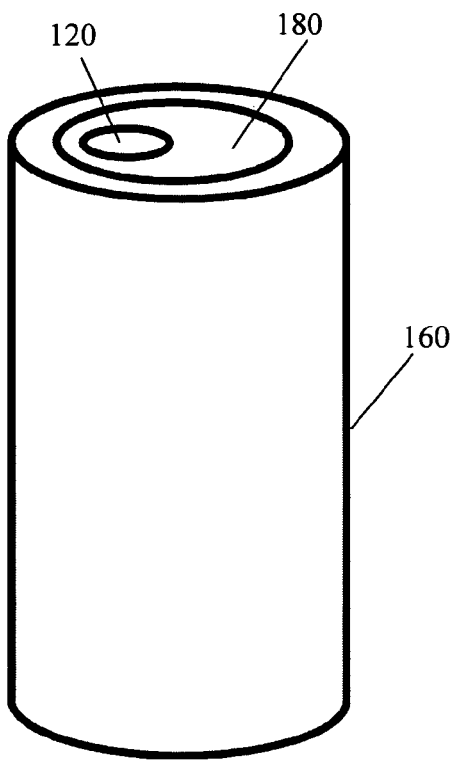
FIG. 5 shows a perspective view of a nonconcentric coaxial cometal waveguide.

FIG. 5 shows a nonconcentric coaxial waveguide that includes two cylindrical metallic electrodes (an inner conductor and an outer conductor). A dielectric material can fill the space between the inner conductor and the outer conductor.

Figure 6:
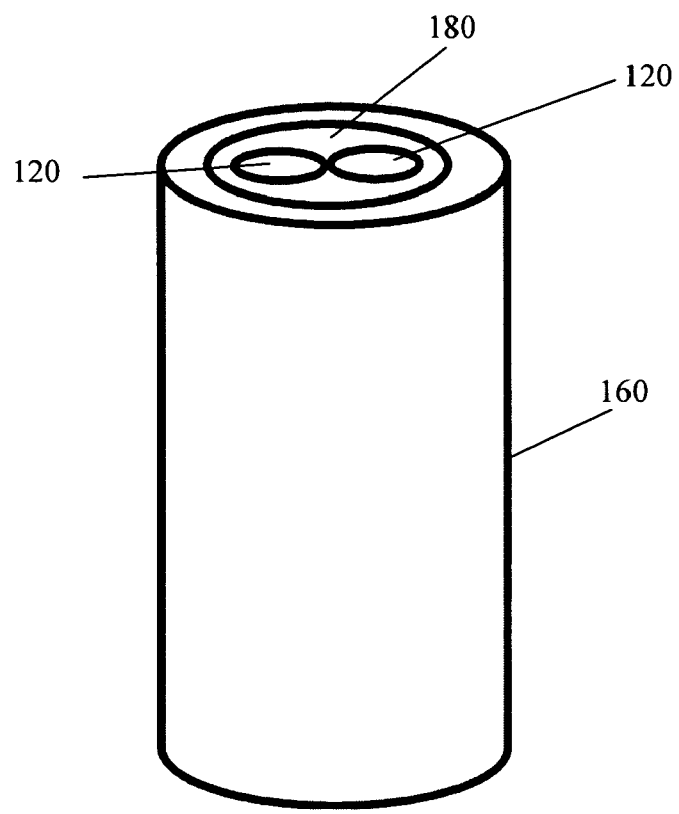
FIG. 6 shows a perspective view of a multi-core coaxial cometal waveguide.

FIG. 6 shows a multi-core coaxial waveguide that includes a plurality of nonconcentric metallic electrodes (several inner conductors and an outer conductor). A dielectric material can fill the space between the inner conductors and the outer conductor.

Figure 7:
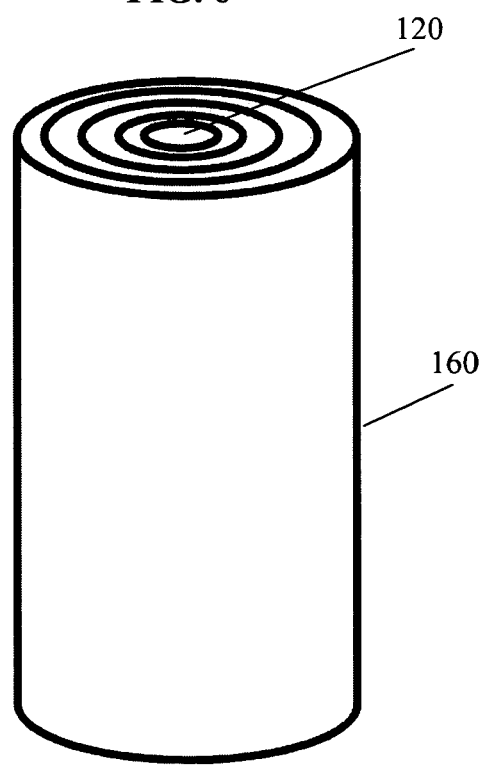
FIG. 7 shows a perspective view of a multi-metal concentric coaxial cometal waveguide.

FIG. 7 shows a multi-metal concentric coaxial waveguide that includes a plurality of concentric metallic electrodes (a core conductor, several inner conductors and an outer conductor). A dielectric material can fill the space between the inner conductors and the outer conductors. Some of the inner metallic cylinders can be made of transparent metals. For example, the inner conductor in FIG. 7 can be made of a transparent metal. For an optical propagating mode (i.e., TEM) this structure is a conventional two-electrode coax (similar to FIG. 4), but with an additional bias electrode. For a sufficiently large inter-electrode spacing, multi-mode propagation occurs in which TE and TM modes can propagate in addition to the TEM mode.

Figure 8:
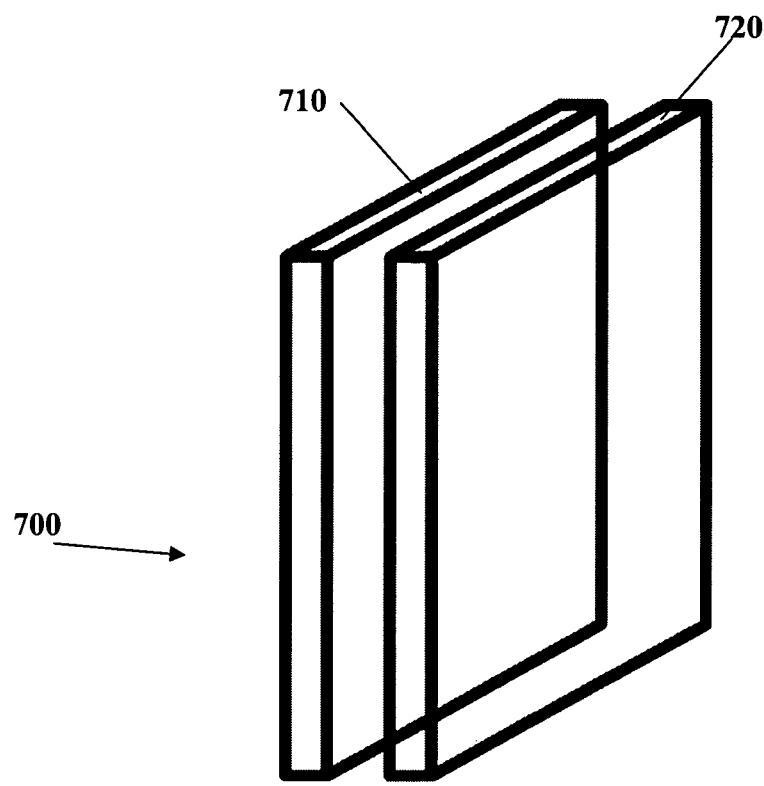
FIG. 8 shows a perspective view of a parallel coplanar cometal waveguide.

FIG. 8 shows a parallel coplanar waveguide 700 including a first electrical conductor 710 and a second electrical conductor 720. In an embodiment, the first and second electrical conductors 710 and 720 are approximately parallel to each other. In an embodiment, the first and second electrical conductors 710 and 720 are metallic electrodes. A dielectric material can be located in the space between the electrical conductors 710 and 720. Air or a vacuum can be located in the space between the electrical conductors 710 and 720. When the intervening space between the electrical conductors 710 and 720 is filled with the photovoltaic dielectric material, the waveguiding function delivers light energy to the photovoltaic dielectric material, where it is converted to electrical energy.

Figure 9:
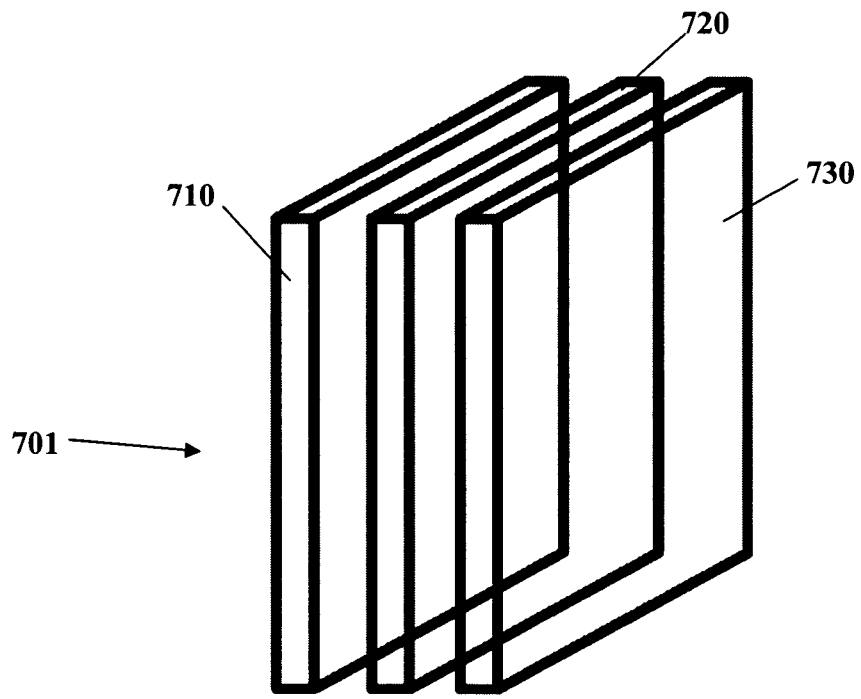
FIG. 9 shows a perspective view of a multi-layer parallel coplanar cometal waveguide.

FIG. 9 shows a multi-layer parallel coplanar waveguide 701 including a plurality of electrical conductors 710, 720, 730. In an embodiment, the plurality of electrical conductors are approximately parallel to each other. In an embodiment, the plurality of electrical conductors are metallic electrodes. A dielectric material can be located in the spaces between the plurality of electrical conductors. Air or a vacuum can be located in the space between the plurality of electrical conductors. When the intervening space between the plurality of electrical conductors is filled with the photovoltaic dielectric material, the waveguiding function acts to deliver light energy to the photovoltaic dielectric material, where it is converted to electrical energy.

Some of the inner electrical conductors can be made of transparent metals. For example, the middle electrical conductor 720 in FIG. 9 can be made of a transparent metal. For an optical propagating mode (i.e., TEM mode) this structure is a parallel coplanar waveguide 701 (similar to FIG. 8), but with an additional bias electrode. A multi-mode propagation, i.e. propagation of TE and TM modes, can be achieved with sufficiently large inter-electrode spacing.

Figure 10:
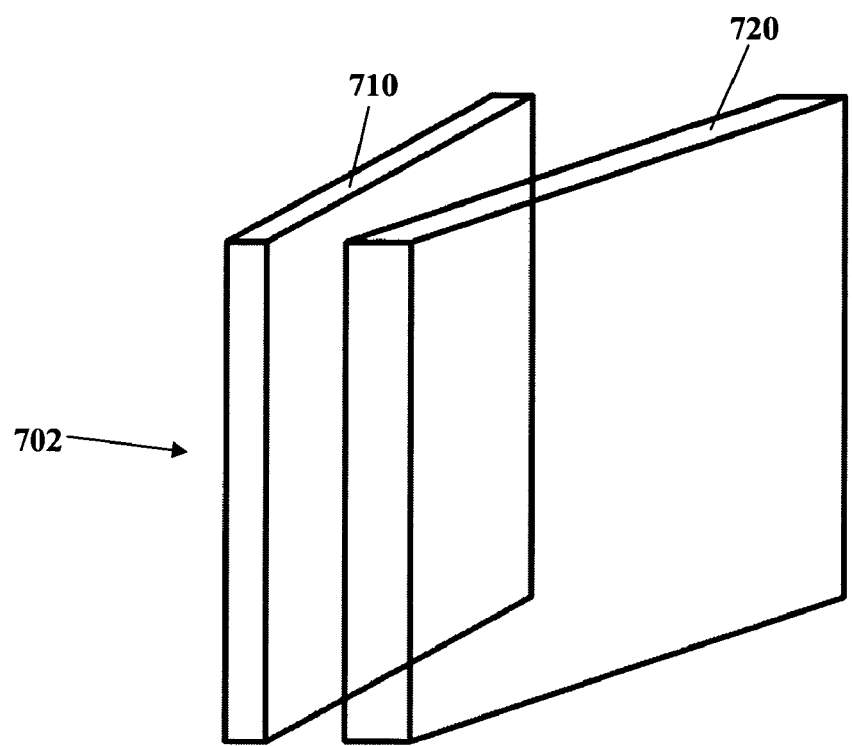
FIG. 10 shows a perspective view of a nonparallel coplanar cometal waveguide.

FIG. 10 shows a nonparallel coplanar waveguide 702 in which the first electrical conductor 710 and the second electrical conductor 720 are not parallel. In an embodiment, the first and second electrical conductors 710 and 720 are metallic electrodes. A dielectric material can be located in the space between the electrical conductors 710 and 720. Air or a vacuum can be located in the space between the electrical conductors 710 and 720. When the intervening space between the electrical conductors 710 and 720 is filled with the photovoltaic dielectric material, the waveguiding function delivers light energy to the photovoltaic dielectric material, where it is converted to electrical energy. In an embodiment, a multilayer version of the nonparallel coplanar waveguide has three or more nonparallel electrical conductors.

Figure 11:
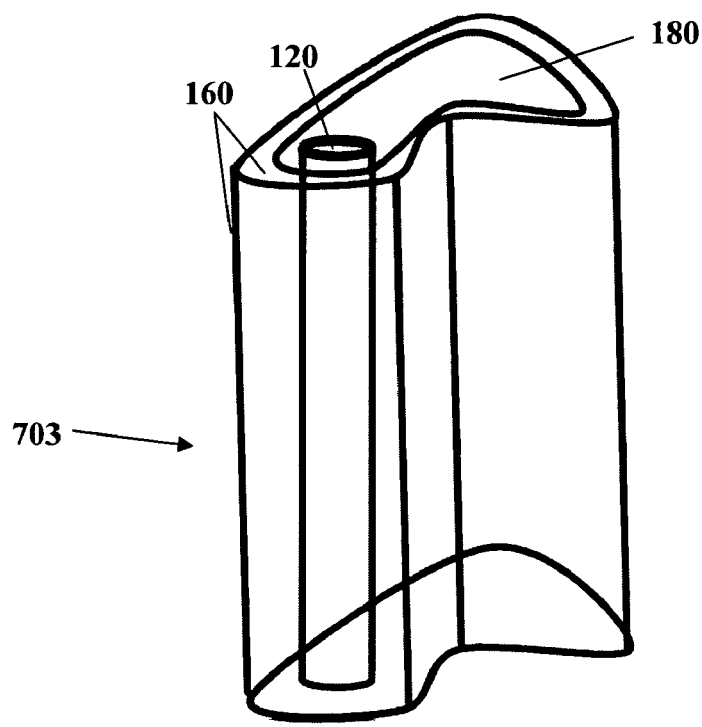
FIG. 11 shows a perspective view of an arbitrary shape cometal waveguide.

FIG. 11 shows an arbitrary shape cometal waveguide 703. The structure shape is invariant in the propagation direction. In a embodiment, a multilayer version of the arbitrary shape cometal waveguide has three or more layers. A dielectric material 180 can be located in the space between an inner conductor 120 and an outer conductor 160. When the intervening space between the inner conductor 120 and the outer conductor 160 is filled with photovoltaic dielectric material 180, the waveguiding function acts to deliver light energy to the photovoltaic material 180, where it is converted to electrical energy.

The inner conductors, the outer conductors and the devices can have various shapes, including but not limited to round, square, rectangular, circular, cylindrical and other symmetrical and non-symmetrical shapes. Certain shapes may be more efficient by allowing for an increase or decrease in the density of the devices on an array. Those skilled in the art will recognize that the inner conductors, the outer conductors and the devices can have any shape and any cross section and still be within the spirit and scope of the present invention.

A nanoscale optics apparatus for manipulating light comprises a plurality of nanoscale cometal structures each comprising a dielectric material located between a first electrical conductor and a second electrical conductor.

The thickness of the photovoltaic material is the separation distance between the first electrical conductor and the second electrical conductor. In an embodiment, the separation distance between the first electrical conductor and the second electrical conductor is nanoscale and the thickness of the photovoltaic material is nanoscale. Charge carriers (electrons and holes) liberated by solar energy via a photovoltaic effect need travel only nanoscale distances to be harvested in the form of electric current or voltage. The thickness of the photovoltaic material should be approximately the same as or less than the carrier diffusion length. For example, in amorphous silicon (Si), the carrier diffusion length is about 100 nm. For TEM propagation, the overall inter-electrode spacing in the cometal structure should be approximately the same as the photovoltaic material.

For a sufficiently large inter-electrode spacing, multi-mode propagation occurs in which the TE (transverse electric) and/or TM (transverse magnetic) modes can propagate in addition to the TEM mode. Multi-mode propagation can occur with a transparent conductor core (inner conductor) or a transparent conductor located between the inner conductor and the outer conductor (in addition to the dielectric or photovoltaic material). The transparent conductor can have a diameter smaller or larger than the light wavelength, so that light can enter directly in addition to indirectly via an antenna. The transparent conductor may have a nanoscale-thickness dielectric or photovoltaic material on one or both sides. For multi-mode propagation, the overall inter-electrode spacing in the cometal structure should be approximately the same as the light wavelength.

In an embodiment, a protruding portion of the first electrical conductor extends beyond the second electrical conductor to act as antenna. A substrate may support the plurality of nanoscale cometal structures. In an embodiment, a transparent conductor is located between the first electrical conductor and the second electrical conductor.

In an embodiment, the plurality of cometal structures are connected in series, resulting in a total photovoltaic voltage being approximately a sum of voltages photo-generated by each cometal structure. In an embodiment, the plurality of cometal structures are connected in parallel, resulting in a total voltage between a minimum and a maximum of the voltages photo-generated by each cometal structure.

In a photovoltaic cometal structure, light energy is absorbed by the photovoltaic semiconductor dielectric medium and transferred to electrons in the semiconductor valence band. This increases the energy of the electrons, promoting them to the semiconductor conduction band, where they become mobile. Each electron that has been promoted to the conduction band leaves behind a hole in the valence band. The hole can be considered a positively-charged entity, in contrast to the electron's negative electrical charge, and the hole is also mobile. Once this electron-hole pair has been generated, each of the electron and the hole must be harvested, by migrating to a metal electrode. The migration happens under the influence of an electric field, with the holes moving in the direction of the field, the electrons against the field.

An electric field in a photovoltaic cometal structure can be created in several ways including a Schottky barrier, a p-n junction and a p-i-n junction. A Schottky barrier is a metal-semiconductor junction that has rectifying characteristics, suitable for use as a diode. Most metal-semiconductor junctions intrinsically form a Schottky barrier. By forming two Schottky barriers, one at each metal-semiconductor junction in the cometal structure, an appropriate electric field is established. A p-n junction is formed by combining n-type semiconductors and p-type semiconductors together in close contact. A p-n junction also establishes an electric field. A p-i-n junction (p-type semiconductor, intrinsic semiconductor, n-type semiconductor) is a junction diode with a wide, undoped intrinsic semiconductor region between p-type semiconductor and n-type semiconductor regions. For manipulating light, the p- and n-regions are thin relative to the intrinsic semiconductor region, and are present to establish the electric field.

Figure 12:
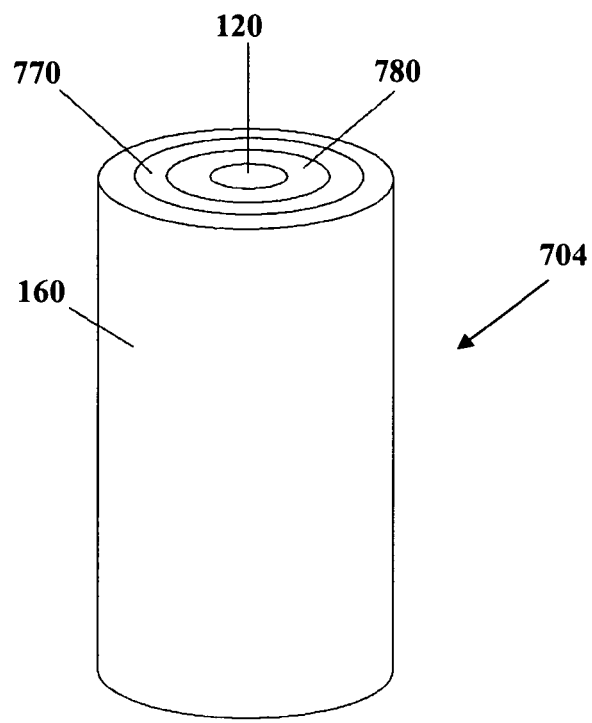
FIG. 12 shows a perspective view of a nanoscale coaxial cometal structure having a p-n junction.

FIG. 12 shows a nanoscale photovoltaic coaxial structure 704 having a p-n junction. The p-type photovoltaic semiconductor layer 770 and the n-type photovoltaic semiconductor layer 780 can be interchanged, so either one can be adjacent to the inner electrical conductor 120 with the other adjacent to the outer conductor 160.

Figure 13:
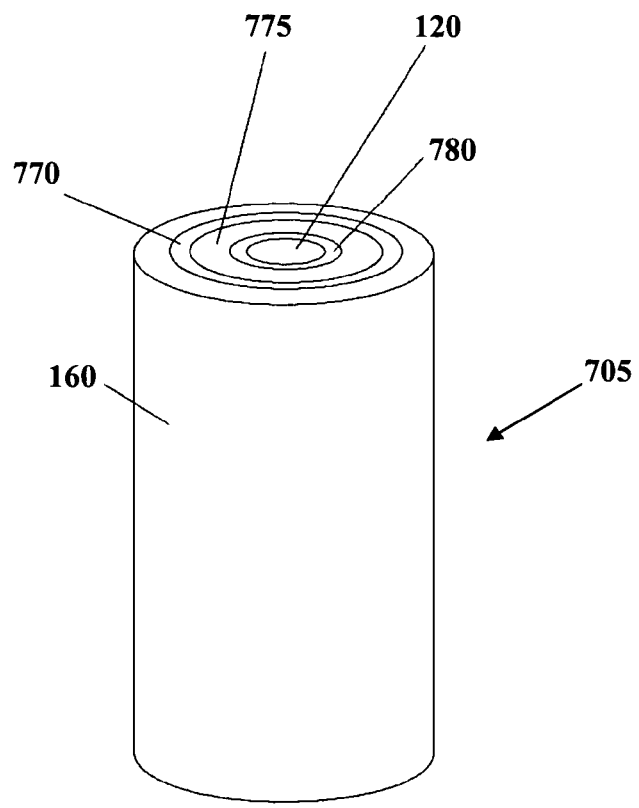
FIG. 13 shows a perspective view of a nanoscale coaxial cometal structure having a p-i-n junction.

FIG. 13 shows a nanoscale photovoltaic coaxial structure 705 having a p-i-n junction. The p-type photovoltaic semiconductor 770 layer and the n-type photovoltaic semiconductor layer 780 can be interchanged, so either one can be adjacent to the inner electrical conductor 120 with the other adjacent to the outer conductor 160. The intrinsic semiconductor layer 775 is between the p-type 770 layer and the n-type layer 780.

A coaxial nanoscale optics apparatus comprises a plurality of nanoscale coaxial structures each comprising an electrically conducting core contacting a dielectric material and coated with an outer electrical conductor layer.

In an embodiment, the dielectric material contacts a portion of the electrically conducting core. A substrate may support the plurality of nanoscale coaxial structures. In an embodiment, the dielectric material is photovoltaic and contains a p-n junction comprised of photovoltaic semiconductors. In an embodiment, the dielectric material is photovoltaic and contains a p-i-n junction formed of a p-type semiconductor layer, an intrinsic photovoltaic semiconductor layer and an n-type semiconductor layer. In an embodiment, a transparent conductor is located between the electrically conducting core and the outer electrical conductor layer. In an embodiment, a protruding portion of the electrically conducting core extends beyond the outer electrical conductor layer to act as an antenna.

In an embodiment, the plurality of photovoltaic coaxial structures are connected in series, resulting in a total voltage being a sum of voltages photo-generated by each coaxial structure. In an embodiment, the plurality of coaxial structures are connected in parallel, resulting in a total voltage between a minimum and a maximum of the voltages photo-generated by each cometal structure.

Figure 14:
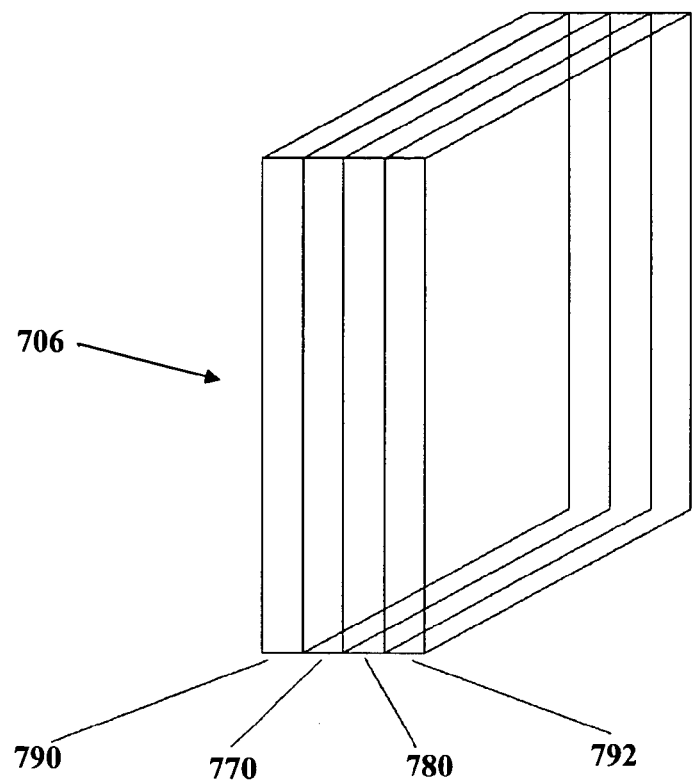
FIG. 14 shows a perspective view of a nanoscale coplanar cometal structure having a p-n junction.

FIG. 14 shows a nanoscale photovoltaic coplanar structure 706 having a p-n junction. The p-type photovoltaic semiconductor layer 770 and the n-type photovoltaic semiconductor layer 780 can be interchanged, so either one can be adjacent to the first electrically conducting layer 790 with the other adjacent to the second electrically conducting layer 792.

Figure 15:
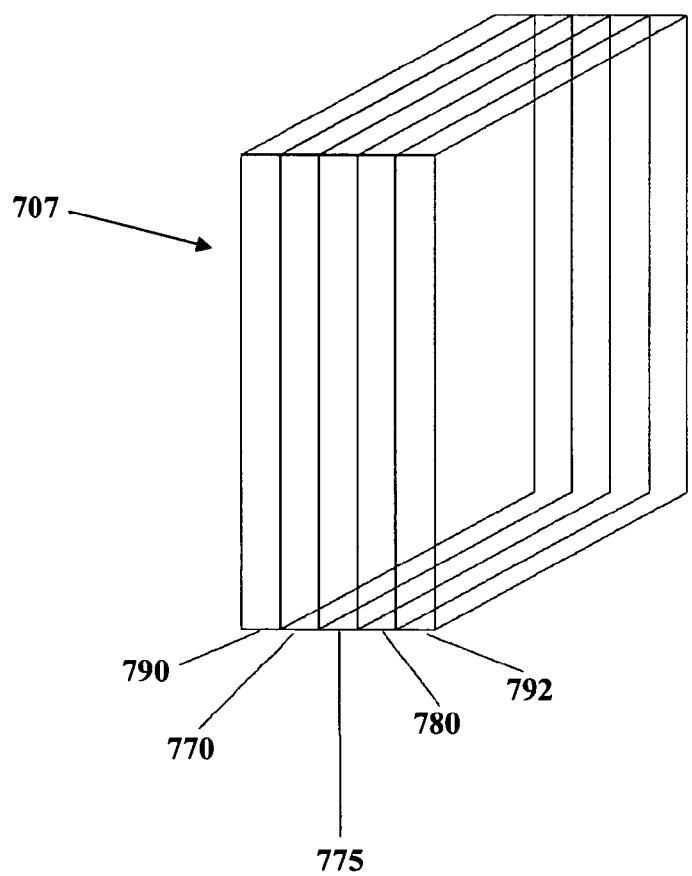
FIG. 15 shows a perspective view of a nanoscale coplanar cometal structure having a p-i-n junction.

FIG. 15 shows a nanoscale photovoltaic coplanar structure 707 having a p-i-n junction. The p-type photovoltaic semiconductor layer 770 and the n-type photovoltaic semiconductor layer 780 can be interchanged, so either one can be adjacent to the first electrically conducting layer 790 with the other adjacent to the second electrically conducting layer 792. The intrinsic semiconductor layer 775 is between the p-type 770 layer and the n-type layer 780.

A coplanar nanoscale optics apparatus comprises a plurality of nanoscale coplanar structures each comprising a dielectric layer located between a first electrically conducting layer and a second electrically conducting layer; wherein light enters the coplanar structure between the first electrically conducting layer and the second electrically conducting layer.

In an embodiment, the first electrically conducting layer is approximately parallel to the second electrically conducting layer. A substrate may support the plurality of nanoscale coplanar structures. In an embodiment, the first electrically conducting layer and the second electrically conducting layer are electrically contacted only through the dielectric layer. In an embodiment, the dielectric material is photovoltaic and contains a planar p-n junction. In an embodiment, the dielectric material is photovoltaic and contains a planar p-i-n junction formed of a p-type semiconductor layer, an intrinsic photovoltaic semiconductor layer and an n-type semiconductor layer. In an embodiment, a transparent conductor is located between the first electrically conducting layer and the second electrically conducting layer. In an embodiment, a protruding portion of the first electrically conducting layer extends beyond the second electrically conducting layer acting as an antenna.

In an embodiment, the plurality of photovoltaic coplanar structures are connected in series, resulting in a total voltage being a sum of voltages photo-generated by each coplanar structure. In an embodiment, the plurality of photovoltaic coplanar structures are connected in parallel, resulting in a total voltage between a minimum and a maximum of the voltages photo-generated by each cometal structure.

Figure 16:
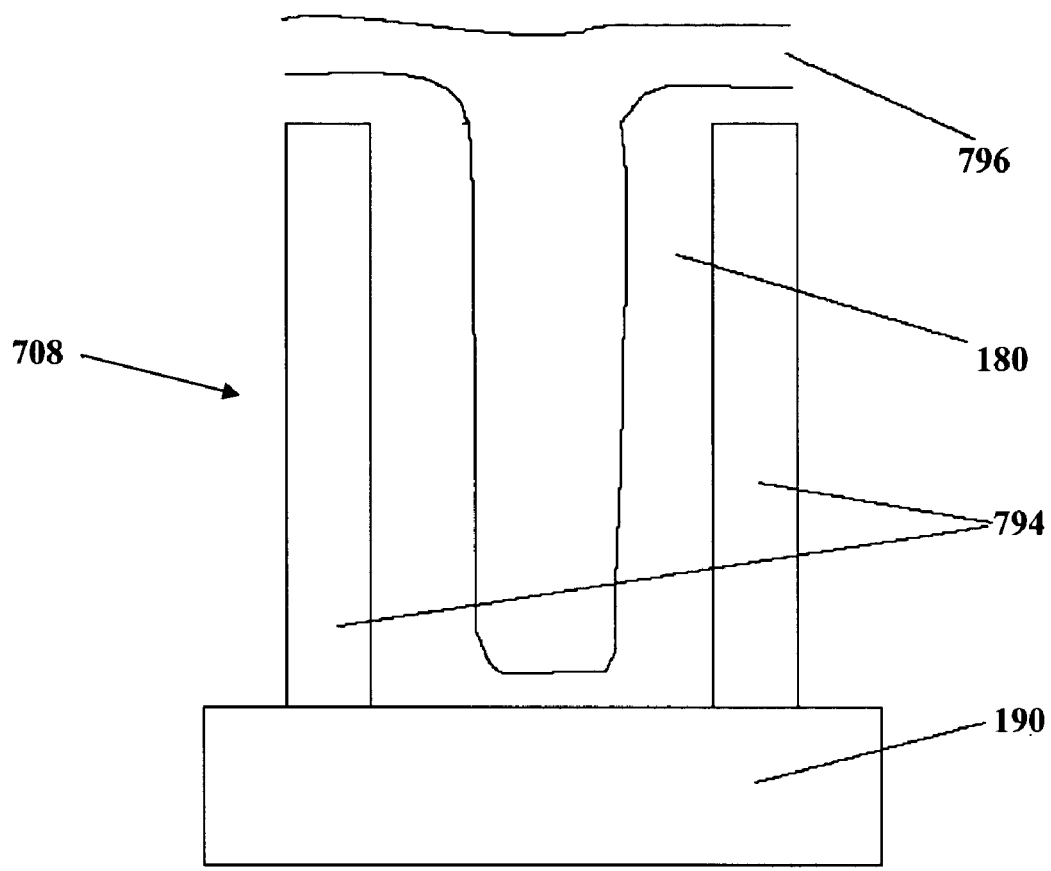
FIG. 16 shows a side view of a nanoscale coplanar cometal structure.

FIG. 16 shows a side view of a nanoscale coplanar structure 708. In this embodiment, the second metal 796 is located between two of the first metals 794 with a photovoltaic material 180 located between the first metal 794 and the second metal 796. The multiple first metals 794 may be parallel to each other or at angle. The second metal 796 and the first metals 794 may be parallel to each other or at angle. The second metal 796 also serves as a top conductor. The dielectric material 180 can be any photovoltaic or dielectric material, p-n junction, or p-i-n junction configurations described herein or known in the art. When the substrate is conducting and transparent, light energy from below reaches the photovoltaic material 180, where it is converted to electrical energy in the nanoscale coplanar structure.

The efficiency of the coupling of external radiation to the cometal structures depends on the geometry of the structure and the electromagnetic mode of operation. Some cometal structures, e.g. the coplanar structures shown in FIGS. 8-10 and 14-16, couple to the radiation without any arrangements, even for the inter-electrode separations much smaller than the wavelength. In other structures, such as the nanoscale coaxial line, no arrangements are required for sufficiently large external diameters, equal or greater than the wavelength. If the inter-electrode channel is much smaller than the radiation wavelength (i.e., only a TEM mode can propagate), special arrangements, such as an antenna, may be necessary.

The presently disclosed embodiments enable antenna-free coupling of the nanoscale cometal structures to external radiation. Antenna-free coupling provides a relaxation of fabrication requirements, thereby enabling surface roughness inherent in some fabrication processes to facilitate desirable radiation collection. Moreover, the antenna-free embodiments disclosed herein allow the nanoscale cometal structures to be tuned to specific discrete ranges of wavelengths, including wavelengths within the visible range.

Figure 17:
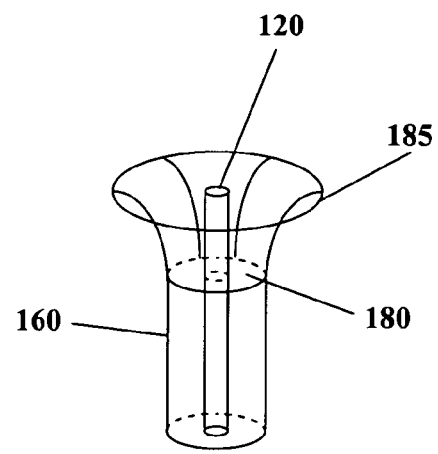
FIG. 17 shows a perspective view of a graded nanoscale coaxial cometal structure.

FIG. 17 shows a nanoscale optics apparatus having a graded nanoscale cometal structure where the diameter of the outer conductor increases toward the end of the nanoscale cometal structure. In graded nanoscale cometal structures, a diameter of the outer conductor becomes larger towards the end coupling to the external radiation. The graded nanoscale cometal structure provides greater photon collection. The graded horn section may have shapes including but not limited to hyperbolic, parabolic, spheroidal, linear, parabolically sloped walls, conical walls or other shapes known in the microwave technology art.

Figure 18:
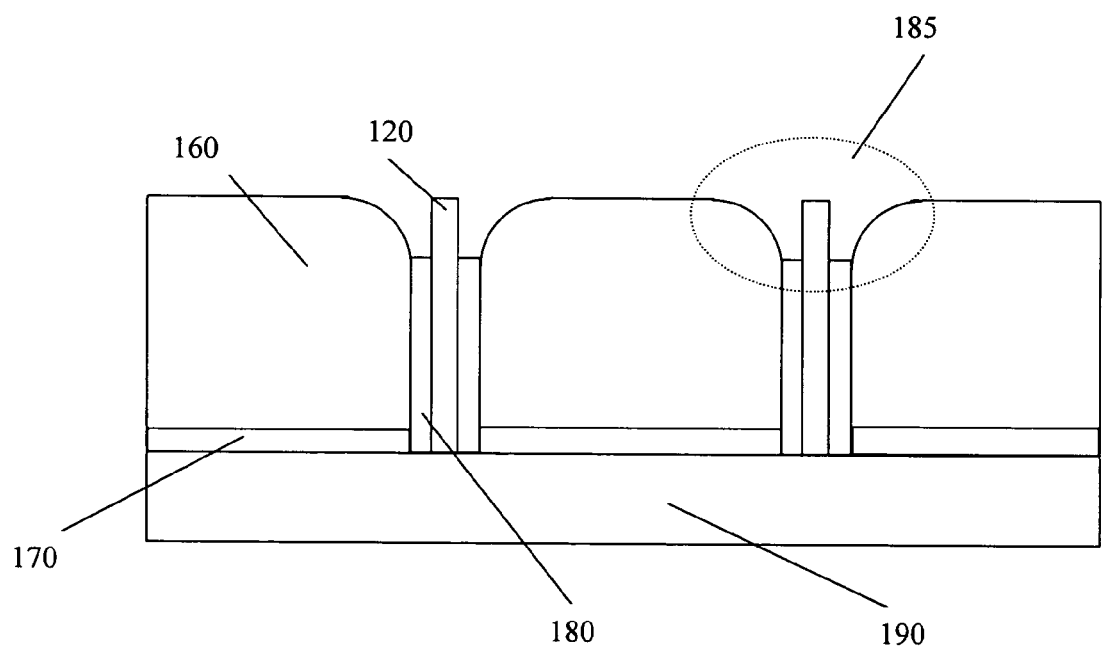
FIG. 18 shows a cross sectional view of an array of graded nanoscale coaxial cometal structures with a concentrator.

FIG. 18 shows a cross sectional view of an array of nanoscale cometal structures with a concentrator, a concave indentation of the outer conductor around the nanoscale cometal structure. The substrate is flexible. In an embodiment, the substrate 190 is aluminum (Al) foil, or other flexible metallic materials (copper, carbon fiber, steel, and similar materials). The substrate is coated with catalytic particles (e.g. Fe, Ni, Co) using wet chemical and electrochemical methods or conventional vacuum deposition techniques (e.g., sputtering, evaporation and similar techniques). Next, internal conductors 120 that are nanotubes are grown using techniques described herein (e.g., CVD, PECVD, and similar techniques), and the substrate area is exposed to oxygen, which affects only the exposed metallic substrate forming a dielectric layer 170. The thin film of semiconductor material 180 is grown using conventional deposition techniques (e.g. CVD and similar techniques). Finally, the substrate area is coated with a soft metallic layer 160 with appropriate wetting property against the dielectric coating 180 such that a concentrator 185 is formed. The concentrator 185 is a concave meniscus adjacent to the coated internal conductors 120. In an embodiment, the metallic powder or liquid will be used to fill the inter-core spacing, followed by a thermal processing to form the concentrator 185. The concave meniscus region around each nanoscale cometal structure acts as a light concentrator 185, an additional antenna collecting light from a much larger area than the nanoantenna itself. The concentrators 185 allow the entire array to be fabricated with a lower number of nanoscale cometal structures, while still maintaining very high efficiency. The concentrators 185 can be simply added to the array of nanoscale cometal structures using techniques known in the art.

In an embodiment, the concentrator 185 self-forms in a conductive medium that poorly wets the surface of a semiconductor-coated nanoscale coaxial cores. A low-wetting metallic medium (e.g., a metallic powder or a liquid containing metallic particles) is deposited as the outer conductor 160, and thermal processing is used to control the wetting angle, i.e. the curvature of the concentrator 185. This will create the light concentrator 185, a convex depression around each nanoscale coaxial core.

FIG. 19 shows a nanoscale optics apparatus having a rough-edge nanoscale cometal structure having an edge of the outer conductor is jagged, or can be periodically shaped (e.g., saw-tooth, a series of semicircular sections, and other shapes known to those skilled in the art.). The depth of the cuts should be of the order of the radiation wavelength.

FIG. 20 shows a nanoscale optics apparatus having a ring-cut nanoscale cometal structure having an upper portion of the outer conductor is completely or partially separated from the rest of the outer conductor below.

FIG. 21 shows a nanoscale optics apparatus having a double-cone nanoscale cometal structure having two cones adjacent to an end of the coax, the top cone attached to the internal conductor, and the bottom cone to the outer conductor.

FIG. 22 shows a nanoscale optics apparatus having a loop nanoscale cometal structure terminating inside a horn. In the loop nanoscale cometal structure, the internal conductor forms a loop, which can, but does not have to, attach to a side wall of the horn.

The presently disclosed embodiments are nano-collectors, nano-receivers, beam splitters, and couplers.

Figure 23:
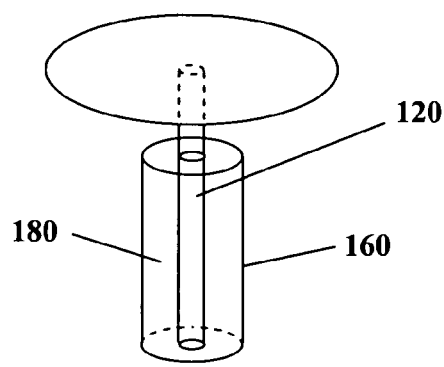
FIG. 23 shows a perspective view of a disc collector engaging a nanoscale coaxial cometal structure.

FIG. 23 shows a nanoscale optics apparatus having a disc collector engaging a nanoscale cometal structure. The disc collector is attached to the internal conductor of the nanoscale cometal structure.

Figure 24:
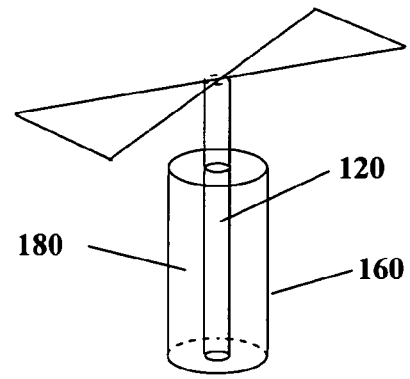
FIG. 24 shows a perspective view of a bow-tie collector engaging a nanoscale coaxial cometal structure.

FIG. 24 shows a nanoscale optics apparatus having a bow-tie collector engaging a nanoscale cometal structure. The bow-tie collector is attached to the internal conductor of the nanoscale cometal structure. Other shapes such as planar spiral, vertical spiral, and other shapes can also be attached to the internal conductor of a nanoscale cometal structure and used as collectors and/or receivers.

Figure 25:
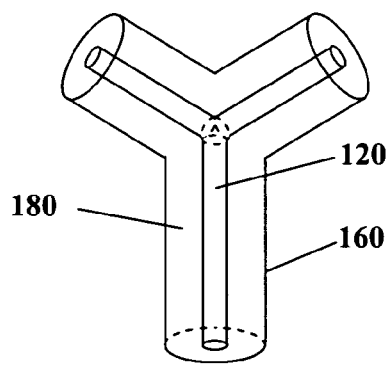
FIG. 25 shows a perspective view of a Y-junction nanoscale coaxial cometal splitter/joiner.

FIG. 25 shows a nanoscale optics apparatus having a Y-junction nanoscale cometal splitter/joiner. The Y-junction nanoscale cometal splitter splits the signal from a single nanoscale cometal structure into two, or compresses two signals into a single signal. The Y-junction nanoscale cometal splitter can split the signal from a single nanoscale cometal structure into multiple signals, or compress multiple signals into a single signal, acting as a nanoscale cometal joiner.

Figure 26:
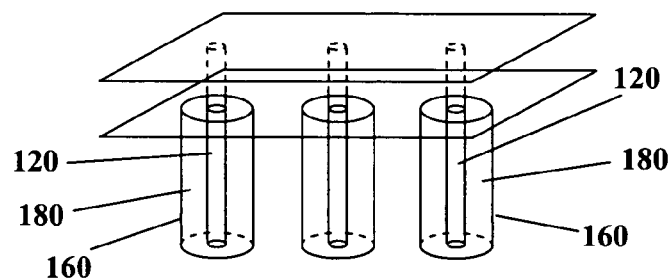
FIG. 26 shows a perspective view of a nanoscale coaxial cometal coupler.

FIG. 26 shows a nanoscale optics apparatus having a nanoscale cometal coupler. A plurality of nanoscale cometal structures can be coupled together. FIG. 26 shows three nanoscale cometal structures coupled via a stripline.

A method of fabricating a nanoscale optics apparatus comprises preparing a plurality of nanowires on a substrate, coating the nanowires with a semiconducting material, and coating the semiconductor with a conducting material. The method yields a metal-semiconductor-metal cometal structure.

In an embodiment, the plurality of nanowires on the substrate are oriented perpendicular to the substrate. In an embodiment, the plurality of nanowires on the substrate are oriented approximately orthogonal to the substrate. In an embodiment, the plurality of nanowires are not perpendicular to the substrate.

In an embodiment, the nanowires are carbon nanotubes. This embodiment comprises coating a substrate with a catalytic material; growing a plurality of carbon nanotubes as internal cores of nanoscale cometal structures on the substrate; oxidizing the substrate; coating the substrate with a semiconducting film; and filling with a metallic medium that wets the semiconducting film of the nanoscale cometal structures.

A nanoscale optics apparatus can be fabricated using the method outlined below or similar methods known to those skilled in the art. A flexible or inflexible substrate such as an aluminum (Al) foil is coated with catalytic material (e.g., Ni) by any suitable technique including but not limited to wet chemical deposition, electro-chemical deposition, CVD, sputtering, evaporation and similar techniques. The processed substrate is used for a catalytic growth of carbon nanotubes. Alternatively, the substrate could be employed as an electrode for electrodeposition of any suitable nanorods/ nanowires as internal conductors and cores of nanoscale cometal structures, without the use of the catalytic material. The growth of the carbon nanotubes can be performed by any appropriate technique including CVD or PECVD and similar techniques. After depositing or growing of the nanowires or nanotubes, the remaining exposed surface of the substrate, i.e. the area free of nanotubes/nanowires, can be oxidized to fabricate a dielectric layer between the substrate and the outer conductor. Alternatively, the oxidation step can be skipped. Then, the entire system can be coated with a semiconducting layer by any suitable technique (e.g. CVD, electro-chemical deposition, and similar techniques), and eventually filled or coated with a metallic medium (e.g. tin (Sn) powder). In one embodiment, the metallic medium should be selected and processed to obtain a weak wetting contact between the metallic medium and the outer conductor of the nanoscale cometal structure, yielding a graded diameter end. The metallic medium can be deposited by any conventional technique, e.g. spraying, painting, spin-coating, CVD, evaporation, sputtering, and similar techniques.

Light can be transmitted long distances through macroscopic media, such as fiber optic cables, but light can not typically be transmitted long distances when the dimensions of the transmission medium are smaller than the wavelength of light. Many applications require propagation through sub-wavelength, nanoscale structures. The nanoscale cometal structures disclosed herein allow such subwavelength transmission, and thus manipulation, of light, including visible light, over super-wavelength distances. As such, the nanoscale cometal structures disclosed herein will be useful in nanoscale manipulation of visible light.

The nanoscale cometal structures disclosed herein allow for flexibility in the control of visible light in nanometer-sized structures, using nanoscale cometal structures, such as coaxial wires, nanocoax, and nanoplanar waveguides.

The nanoscale cometal structures disclosed herein will be useful in nanoscale manipulation of visible light. In an embodiment, the nanoscale cometal structures disclosed herein are visible light waveguides. Cometal structures can transmit light large distances, much larger than the light wavelength. Because nanoscale cometal structures can propagate TEM modes, their dimensions perpendicular to the direction of propagation of light can be much smaller than the light wavelength. Thus, nanoscale cometal structures can be used as subwavelength light waveguides in optoelectronic applications. For example, cometal structures allow for very sharp waveguide turns.

In an embodiment, the nanoscale cometal structures disclosed herein are light splitters and couplers. An embodiment of a Y-junction nanoscale cometal light splitter/joiner is shown in FIG. 25. Light propagating from the bottom along the middle, vertical branch of the nanoscale cometal structure, splits into two waves, each propagating along one of the top arms of the split nanoscale cometal structure. Similarly, two signals, of similar, different or multiple wavelengths, propagating downwards along the two arms, will join into a single wave propagating along the middle arm. Those skilled in the art will recognize that the light splitters and couplers may have shapes other than shown in FIG. 25 and be within the spirit and scope of the presently disclosed embodiments.

In an embodiment, the nanoscale cometal structures disclosed herein are light blockers. A nanoscale cometal structure filled with a photosensitive material that blackens when exposed to light, will act as a light blocker. For nanoscale cometal structures with small inter-electrode distances, the electric field of the transmitted light becomes enhanced, improving the light blocking action of the photosensitive material.

In an embodiment, the nanoscale cometal structures disclosed herein are light mixers. An embodiment of a Y-junction nanoscale cometal light mixer is shown in FIG. 25. When filled with a non-linear optical medium, the Y-junction nanoscale cometal structure of FIG. 25 acts as a light mixer. For example, a light wave of one wavelength enters the top left arm of the split nanoscale cometal structure, and a second light wave having a different wavelength enters the top right arm. The plurality of waves will interact in the center of the nanoscale cometal structure, and mix due to the non-linear action of the medium. The resulting mixed waves will emerge in the bottom arm. Those skilled in the art will recognize that the light mixer may have shapes other than shown in FIG. 25 and be within the spirit and scope of the presently disclosed embodiments.

In an embodiment, the nanoscale cometal structures disclosed herein are discrete optics. A thin film of a material with an array of densely spaced (less than the wavelength) nanoscale cometal structures (with inner core extension antennas) penetrating through the film, decomposes the incoming plane wave of light into partial waves, each propagating through a nanoscale cometal structure. The partial waves will emerge on the other side of the film from the nanoscale cometal structure (via antennas) in the form of the partial spherical waves. As long as the nanoscale cometal structures are identical, the waves will assemble (constructively interfere) into a plane wave of light, propagating in the same direction as the initial wave. Thus, this nanoscale cometal film acts as a transparent glass plate.

The transmission through individual nanoscale cometal structures can be controlled. For example, if the nanoscale cometal structures had different lengths, the phases of the emerging partial waves would be different. The controlled time delay can be also achieved by filling the interior of the nanoscale cometal structures with a medium, having a dielectric constant changes with bias. Contacting individual nanoscale cometal structures could then be used to electrically control the phases of the partial waves. In an embodiment, the final interference of the partial waves can be controlled by switching off individual nanoscale cometal structures by filling their interior with a material that becomes highly conductive under electric or magnetic bias, and thus will short the electrodes of a nanoscale cometal structure.

Being able to control the propagation characteristics of individual nanoscale cometal structures enables control of various interference characteristics of the outgoing radiation, and is the basis of the discrete optics. The fundamental control of light provided by discrete optics one can be used in numerous applications, including but not limited to light focusing, light beam scanning, and other manipulations of light known to those skilled in the art.

In an embodiment, the nanoscale cometal structures disclosed herein are light resonators. Having a finite length equal to an integer multiple of the half-wavelength, allows for a development of standing optical waves inside a nanoscale cometal structure. Thus, part of the energy of the incoming light becomes trapped inside the cometal structure. This resonant behavior can be used to develop frequency filters.

In an embodiment, the nanoscale cometal structures disclosed herein are used for nananoscale optical microscopy including near-field scanning optical microscopy (NSOM). A nanoscale optical probe for use with a near-field scanning optical microscope includes an inner conductor having a top end, a bottom end, and a body; a dielectric material which surrounds the inner conductor; and an outer conductor which surrounds the dielectric material, wherein the inner conductor is longer at a tip surface of the probe than the dielectric material and the outer conductor. A "nanoscale optical microscope" is disclosed in U.S. application Ser. No. 11/509,519, filed Aug. 24, 2006, which is hereby incorporated herein by reference in its entirety for the teachings therein.

In an embodiment, the nanoscale cometal structures disclosed herein are optical switches. A nanoscale cometal structure filled with a photosensitive material that blackens when exposed to light, acts as a light activated light switch. Injecting an additional flux of light into the nanoscale cometal structure enforces the photoresistive material blackening, and will switch off the transmission through the nanoscale cometal structure. In an embodiment, a nanoscale cometal structure filled with a material that becomes conductive under bias will act as a light bias activated light switch. The increased conductivity light bias activated light switch shorts the electrodes of the nanoscale cometal structure. An "apparatus and methods for optical switching using nanoscale optics" is disclosed in U.S. application Ser. No. 11/509,398, filed Aug. 24, 2006, which is hereby incorporated herein by reference in its entirety for the teachings therein.

In an embodiment, the nanoscale cometal structures disclosed herein are used for nanolithography. A de-magnifying, contact lens capable of nanoscopic resolution can be made by having the discrete optics film, with nanoscale cometal structures wired so that they are not parallel, but converge on one side of the film. The separation between the nanoscale cometal structures on the illuminating side of the film will be macroscopic, but nanoscopic on the substrate side. An image projected on the macroscopic illuminating side of the film will be transferred to the substrate side via partial waves, and will have reduced dimensions. Correspondingly, the resolution of the image is enhanced. The de-magnifying lens is used in the contact mode to expose a photoresist. An "apparatus and methods for nanolithography using nanoscale optics" is disclosed in U.S. application Ser. No. 11/509,271, filed Aug. 24, 2006, which is hereby incorporated herein by reference in its entirety for the teachings therein.

In an embodiment, the nanoscale cometal structures disclosed herein are solar cells. A solar cell is a device that collects or absorbs solar energy and converts the solar energy into electricity, heat or another usable form. A medium made of nanoscale cometal structures acts as a solar cell when the interior of each nanoscale cometal structures is filled with a dielectric medium that is photovoltaic. In addition, if the inter-electrode separation is small (i.e., nanoscopic), an efficient carrier collection can be achieved, without scarifying the photon collection efficiency that remains high along the length of the nanoscale cometal structure. An "apparatus and methods for solar energy conversion using nanocoax structures" is disclosed in U.S. application Ser. No. 11/401,606, filed Apr. 10, 2006, which is hereby incorporated herein by reference in its entirety for the teachings therein. An "apparatus and methods for solar energy conversion using nanoscale cometal structures" is disclosed in U.S. application Ser. No. 11/509,269, filed Aug. 24, 2006, which is hereby incorporated herein by reference in its entirety for the teachings therein.

The nanoscale cometal structures disclosed herein can also be used as transmitted light modifiers, image encoders, image filters, nanoscale collectors, nanoscale receivers, and nanoscale couplers and be within the spirit and scope of the presently disclosed embodiments.

All patents, patent applications, and published references cited herein are hereby incorporated by reference in their entirety. It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A coaxial nanoscale optics apparatus for manipulating light comprising: a plurality of nanoscale coaxial structures each comprising an electrically conducting core contacting a dielectric material which is coated with an outer electrical conductor layer; and a substrate supporting the plurality of nanoscale coaxial structures.

2. The coaxial nanoscale optics apparatus of claim 1 wherein the dielectric material contacts a portion of the electrically conducting core.

3. The coaxial nanoscale optics apparatus of claim 1 further comprising a protruding portion of the electrically conducting core extending beyond the outer electrical conductor layer.

4. The coaxial nanoscale optics apparatus of claim 1 wherein the dielectric material is a photovoltaic material that contains a p-n junction comprised of photovoltaic semiconductors.

5. The coaxial nanoscale optics apparatus of claim 1 wherein the dielectric material is a photovoltaic material that contains a p-i-n junction formed of a p-type semiconductor layer, an intrinsic photovoltaic semiconductor layer and an n-type semiconductor layer.

6. The coaxial nanoscale optics apparatus of claim 1 further comprising a transparent conductor located between the electrically conducting core and the outer electrical conductor layer.

7. The coaxial nanoscale optics apparatus of claim 1 wherein the plurality of coaxial structures are connected in series and the dielectric material is photovoltaic, resulting in a total photovoltaic voltage being a sum of voltages photo-generated by each coaxial structure.

8. The coaxial nanoscale optics apparatus of claim 1 wherein the plurality of coaxial structures are connected in parallel and the dielectric material is photovoltaic, resulting in a total photovoltaic voltage between a minimum and a maximum of the voltages photo-generated by each coaxial structure.

9. The coaxial nanoscale optics apparatus of claim 1 wherein the core comprises a nanotube, nanowire, nanofiber or nanorod, the dielectric material comprises a photovoltaic semiconductor material, and a distance between the core and the outer electrical conductor layer is 100 nm or less.

10. The coaxial nanoscale optics apparatus of claim 9 wherein the plurality of nanoscale coaxial structures are aligned perpendicular to a top surface of the substrate.

11. A coplanar nanoscale optics apparatus for manipulating light comprising: a plurality of nanoscale coplanar structures each comprising a dielectric layer located between a first electrically conducting layer and a second electrically conducting layer; wherein light enters the coplanar structure between the first electrically conducting layer and the second electrically conducting layer.

12. The coplanar nanoscale optics apparatus of claim 11 wherein the dielectric layer is air or a vacuum.

13. The coplanar nanoscale optics apparatus of claim 11 wherein the first electrically conducting layer is approximately parallel to the second electrically conducting layer.

14. The coplanar nanoscale optics apparatus of claim 11 further comprising a protruding portion of the first electrically conducting layer extending beyond the second electrically conducting layer.

15. The coplanar nanoscale optics apparatus of claim 11 further comprising a substrate that supports the plurality of nanoscale coplanar structures.

16. The coplanar nanoscale optics apparatus of claim 11 wherein the first electrically conducting layer and the second electrically conducting layer are electrically contacted only through the photovoltaic layer.

17. The coplanar nanoscale optics apparatus of claim 11 wherein the dielectric layer is a photovoltaic material that contains a planar p-n junction.

18. The coplanar nanoscale optics apparatus of claim 11 wherein the dielectric layer is a photovoltaic material that contains a planar p-i-n junction formed of a p-type semiconductor layer, an intrinsic photovoltaic semiconductor layer and an n-type semiconductor layer.

19. The coplanar nanoscale optics apparatus of claim 11 further comprising a transparent conductor located between the first electrically conducting layer and the second electrically conducting layer.

20. The coplanar nanoscale optics apparatus of claim 11 wherein the plurality of coplanar structures are connected in series and the dielectric layer is photovoltaic, resulting in a total photovoltaic voltage being a sum of voltages photo-generated by each coplanar structure.

21. The coplanar nanoscale optics apparatus of claim 11 wherein the plurality of coplanar structures are connected in parallel and the dielectric layer is photovoltaic, resulting in a total photovoltaic voltage between a minimum and a maximum of the voltages photo-generated by each coplanar structure.

22. The coplanar nanoscale optics apparatus of claim 11 wherein the dielectric layer comprises a photovoltaic semiconductor material, and a distance between the first electrically conducting layer and the second electrically conducting layer is 100 nm or less.

23. The coplanar nanoscale optics apparatus of claim 22 wherein the plurality of nanoscale coplanar structures are aligned perpendicular to a top surface of a substrate.

24. A method of fabricating a nanoscale optics apparatus for manipulating light comprising: preparing a plurality of nanoscale planar structures; coating a plurality of planar surfaces of the plurality of planar structures with a dielectric while leaving space between the plurality of planar surfaces; and coating the dielectric with an outer electrical conductor layer, wherein a portion of the outer electrical conductor layer is located between the planar structures to form coplanar structures.

25. A method of claim 24 wherein the dielectric conformally coats the plurality of planar surfaces of the plurality of planar structures.

* * * * *